US008825438B2

(12) United States Patent
Anderson et al.

(10) Patent No.: US 8,825,438 B2
(45) Date of Patent: Sep. 2, 2014

(54) COURSE OF MOTION DETERMINATION

(75) Inventors: Stephen James Anderson, Nailsworth (GB); Andrew Edward Smith, Bristol (GB); James Stephen Edward Cordwell, Bristol (GB)

(73) Assignee: Renishaw PLC, Wotton-Under-Edge (GB)

( * ) Notice: Subject to any disclaimer, the term of this patent is extended or adjusted under 35 U.S.C. 154(b) by 375 days.

(21) Appl. No.: 12/673,114

(22) PCT Filed: Aug. 19, 2008

(86) PCT No.: PCT/GB2008/002823
§ 371 (c)(1),
(2), (4) Date: Feb. 11, 2010

(87) PCT Pub. No.: WO2009/024783
PCT Pub. Date: Feb. 26, 2009

(65) Prior Publication Data
US 2011/0264402 A1    Oct. 27, 2011

(30) Foreign Application Priority Data

Aug. 20, 2007   (GB) .................................. 0716218.3

(51) Int. Cl.
*G01C 9/00* (2006.01)
(52) U.S. Cl.
USPC ........................................................ 702/150
(58) Field of Classification Search
None
See application file for complete search history.

(56) References Cited

U.S. PATENT DOCUMENTS

| | | | |
|---|---|---|---|
| 3,478,436 A | 11/1969 | Barnes | |
| 3,678,584 A | 7/1972 | Dolan | |
| 4,631,834 A | 12/1986 | Hayashi et al. | |
| 5,189,806 A | 3/1993 | McMurtry et al. | |
| 5,212,646 A | 5/1993 | McMurtry | |
| 5,222,034 A | 6/1993 | Shelton et al. | |
| 5,251,156 A | 10/1993 | Heier et al. | |
| 5,465,221 A | 11/1995 | Merat et al. | |
| 5,517,190 A * | 5/1996 | Gunn | ........................ 340/870.18 |
| 5,675,902 A | 10/1997 | Chase | |

(Continued)

FOREIGN PATENT DOCUMENTS

| | | |
|---|---|---|
| CN | 1748187 A | 3/2006 |
| DE | 100 50 795 A1 | 7/2001 |

(Continued)

OTHER PUBLICATIONS

Limaiem et al.; "Integrated Accessibility Analysis and Measurement Operations Sequencing for CMMs;" *Journal of Manufacturing Systems*; 2000; pp. 83-93; vol. 19; No. 2.

(Continued)

*Primary Examiner* — Aditya Bhat
(74) *Attorney, Agent, or Firm* — Oliff PLC

(57) ABSTRACT

A computer-implemented method for determining a course of motion between an artifact (10) and device (28) for interacting with the artifact (10) that are moveable relative to each other in at least one linear (X, Y, Z) and one rotational (A1, A2) degree of freedom, the method comprising: receiving geometric data representing the artifact (10); receiving geometric data representing the device; and determining, from the geometric data, how the device (28) and artifact (10) can be oriented relative to each other along an interaction path so as to comply with one or more optimization criteria.

20 Claims, 19 Drawing Sheets

(56) References Cited

U.S. PATENT DOCUMENTS

| | | | |
|---|---|---|---|
| 5,726,917 | A | 3/1998 | Staaden |
| 6,115,927 | A | 9/2000 | Hendrix |
| 6,154,713 | A | 11/2000 | Peter et al. |
| 6,158,136 | A | 12/2000 | Gotz et al. |
| 6,307,084 | B1 | 10/2001 | Matsuki et al. |
| 6,400,998 | B1 | 6/2002 | Yamazaki et al. |
| 6,460,261 | B1 | 10/2002 | Noda et al. |
| 6,868,356 | B2 | 3/2005 | Nai et al. |
| 7,350,310 | B2 | 4/2008 | Lloyd et al. |
| 7,395,606 | B2 * | 7/2008 | Crampton ............... 33/503 |
| 7,420,588 | B2 | 9/2008 | Asano et al. |
| 7,456,538 | B2 | 11/2008 | Nai et al. |
| 7,533,574 | B2 | 5/2009 | McMurtry et al. |
| 7,783,445 | B2 | 8/2010 | McLean et al. |
| 7,809,523 | B2 | 10/2010 | Hunter et al. |
| 7,971,365 | B2 | 7/2011 | Hunter et al. |
| 8,255,184 | B2 | 8/2012 | Chang et al. |
| 2002/0174555 | A1 | 11/2002 | McMurtry et al. |
| 2003/0014156 | A1 | 1/2003 | Hashimoto et al. |
| 2005/0132591 | A1 | 6/2005 | Kojima et al. |
| 2005/0171733 | A1 | 8/2005 | Hough |
| 2007/0032951 | A1 | 2/2007 | Tanenhaus et al. |
| 2011/0119025 | A1 | 5/2011 | Fetter et al. |
| 2012/0041712 | A1 | 2/2012 | Pettersson |

FOREIGN PATENT DOCUMENTS

| | | |
|---|---|---|
| EP | 0 879 674 A1 | 11/1998 |
| JP | A-10-300455 | 11/1998 |
| JP | B2-2873404 | 1/1999 |
| JP | A-2000-074661 | 3/2000 |
| JP | A-2000-304528 | 11/2000 |
| JP | A-2002-071345 | 3/2002 |
| JP | A-2003-1576 | 1/2003 |
| JP | A-2003-300183 | 10/2003 |
| JP | A-2004-093190 | 3/2004 |
| WO | WO 90/07097 | 6/1990 |
| WO | WO 03/099526 A1 | 12/2003 |
| WO | WO 2004/072740 A2 | 8/2004 |
| WO | WO 2005/060338 A2 | 7/2005 |
| WO | WO 2006/114570 A1 | 11/2006 |
| WO | WO 2008/129301 A2 | 10/2008 |

OTHER PUBLICATIONS

Lim et al.; "CMM feature accessibility and path generation:" *International Journal of Production Research*;1994; pp. 597-618; vol. 32; No. 3.

Spitz et al.; "Accessibility Analysis Using Computer Graphics Hardware;" *IEEE Transactions on Visualization and Computer Graphics*; 2000; pp. 208-219; vol. 6; No. 3.

Son et al.; "Automated laser scanning system for reverse engineering and inspection;" *International Journal of Machine Tools and Manufacture*; 2002; pp. 889-897; vol. 42; No. 8.

Rao et al.; "On local gouging in five-axis sculptured surface machining using flat-end tools;" *Computer Aided Design*;.2000; pp. 409-420; vol. 32; No. 7.

International Search Report for International Application No. PCT/GB2008/002823, issued Jan. 13, 2009.

Written Opinion of the International Searching Authority for International Application No. PCT/GB2008/002823, issued Jan. 13, 2009.

British Search Report for Application No. 0716218.3, issued Nov. 12, 2007.

U.S. Appl. No. 12/450,937 filed in the name of McMurtry et al. on Oct. 19, 2009.

Harris et al.; "A Review of On-Line and Off-Line Programming Facilities for Coordinate Measuring Machines;" *Advanced Factory Automation*; 1994; pp. 581-585.

Medeiros et al.; "Off-Line Programming of Coordinate Measuring Machines Using a Hand-Held Stylus;" *Journal of Manufacturing Systems*; 1994; pp. 401-411; vol. 13; No. 6.

Translation of Japanese Office Action dated Sep. 2, 2011 issued in Japanese Patent Application No. 2008-508276.

"Generation of CMM Probe Path and Its Simulation in NC Verifying Environment," Mechanical Science and Technology, Mar. 2000, vol. 19, No. 2, pp. 269-271 & 280.

Chinese Office Action dated Jan. 29, 2012 issued in Chinese Patent Application No. 200880112360.3 (with translation).

Feb. 28, 2012 Office Action issued in European Patent Application No. 08 788 387.2.

Nov. 15, 2012 Office Action issued in U.S. Appl. No. 12/450,937.

PH9 and PH9A Automated Inspection System User's Guide.

Dec. 6, 2012 Chinese Office Action issued in Patent Application No. 200880112360.3 (with Translation).

May 21, 2012 Office Action issued in U.S. Appl. No. 12/450,937.

Translation of: "The Generation of CMM Measurement Pathways and their Simulation in NC Measurement Environments" (Mechanical Science and Technology, vol. 19, No. 2, Mar. 2000, pp. 269-271 & p. 280).

Xi et al., "CAD-based path planning for 3-D line laser scanning," *Computer-Aided Design*, 31, 1999, pp. 473-479.

Quan et al., "Cutting path planning for ruled surface impellers," *Chinese Journal of Aeronautics*, 21, 2008, pp. 462-471.

Martins et al., "Automated 3D surface scanning based on CAD model," *Mechatronics*, 15, 2005, pp. 837-857.

Newman et al., "A survey of automated visual inspection," *Computer Vision and Image Understanding*, vol. 61, No. 2, 1995, pp. 231-262.

Ailisto, "CAD model-based planning and vision guidance for optical 3D coordinate measurement," *VTT Publications*, 298, 1997, pp. 5-70.

Lin et al., "CAD-based CMM dimensional inspection path planning—a generic algorithm," *Robotica*, vol. 19, 2001, pp. 137-148.

Ainsworth et al., "CAD-based measurement path planning for freeform shapes using contact robes," International Journal of Advanced Manufacturing Technology, 2000, vol. 16, pp. 23-31.

May 31, 2013 Office Action issued in Chinese Patent Application No. 200880112360.3 (with translation).

Jul. 19, 2013 Official Notice of Rejection issued in Japanese Patent Application No. 2010-521474 (with translation).

May 7, 2013 Office Action issued in U.S. Appl. No. 12/450,937.

Jun. 20, 2014 Notification of Reexamination issued in Chinese Patent Application No. 200880112360.3 (with translation).

* cited by examiner

COURSE OF MOTION DETERMINATION

This application is a national stage application of PCT/GB2008/002823 filed on Aug. 19, 2008, the entire contents of which are incorporated herein by reference.

The present invention relates to a method of determining a course of relative motion between an artefact and a device for interacting with the artefact, such as the course of motion of a measurement device mounted on a positioning apparatus for measuring an artefact. In particular, the invention relates to a method of optimised course of motion generation.

In particular the invention is suitable for a measurement apparatus mounted on coordinate positioning apparatus which can vary both the position and orientation of the measurement apparatus. The coordinate positioning apparatus may comprise multiple components, for example an articulating probe head capable of rotational motion about one or more axes, mounted on a coordinate positioning apparatus such as a coordinate measuring machine (CMM), machine tool or the like. The coordinate positioning apparatus may also comprise a single component, such as a manual coordinate measuring arm, inspection robot etc.

It is common practice after workpieces have been produced, to inspect them on a CMM or other type of coordinate positioning apparatus having a quill onto which a measurement probe is mounted which can be driven in three orthogonal directions X, Y, Z within a working volume of the machine.

U.S. Pat. No. 5,189,806 describes an articulating probe head capable of orientating a probe with two rotational degrees of freedom to enable the probe to be used in an operation for scanning the surface of workpieces. In general such a probe head includes two rotary drive mechanisms which enable a probe to be orientated about two substantially orthogonal rotary axes. Such an articulating probe head may be mounted on the quill of a CMM to enable the probe tip to be positioned in 5 degrees of freedom (i.e. 3 linear degrees of freedom provided by the CMM and 2 rotary degrees of freedom provided by the articulating probe head).

When a workpiece is to be measured by the probe, the measurement path along which the measurement device will move must be programmed. Measurement paths may be planned manually, typically through interpretation of CAD drawings, or by operators using software to apply measurements to features from geometrical, e.g. CAD, models of a workpiece to be measured.

Two known types of CAD data are boundary representation (B-Rep) and polygonal modelling (also known as mesh modelling). A B-rep is a method for representing shapes using their limits. A solid can be a collection of connected surface elements, representing the boundary between solid and non solid. B-rep models are comprised of two parts: topology and geometry. Topology describes geometric connectivity through a classification of items. The main topology items are faces described as bounded areas of a surface, edges described as bounded curvilinear sections and discrete three dimensional points in space. The advantage of such parametric model formats is that by referencing this topology their surface descriptions can be actively used in measurement planning.

Polygonal or mesh modelling is another approach for modelling objects by representing or approximating their surfaces using polygons (e.g. triangles). The basic object used in polygonal modelling is a vertex, where a vertex of a polygon is the point of intersection of two polygon edges. Two vertices connected by a straight line become an edge. Three vertices, connected to each other by three edges, define a triangle. Polygonal modeling describes the surface of a workpiece as a collection of polygons (e.g. polygon file format PLY) and often as triangles (e.g. STL, stereolithography format, STL). These formats have the disadvantage that they do not hold parameterised information.

The invention provides a method for generating from a geometric model of an artefact and a geometric model of a tool for interacting with artefact a relative course of motion between the artefact and tool device along an interaction path so as to comply with one or more optimisation criteria.

According to a first aspect of the invention there is provided a computer-implemented method for determining a course of motion between an artefact and device for interacting with the artefact that are moveable relative in at least one linear and one rotational degree of freedom, the method comprising: receiving geometric data representing the artefact; receiving geometric data representing the device; and determining, from the geometric data, how the device and artefact can be oriented relative to each other along an interaction path so as to comply with one or more optimisation criteria.

Using geometric data of the artefact and of the device itself to automatically determine how to relatively orient the device and artefact in the at least one rotational degree of freedom along the interaction path can improve the performance of an operation. Furthermore, as the computer program determines the relative angular orientation along the interaction path, no input or guidance from the user is required.

The method of the present invention can be used to assess the course of motion the device and/or artefact will take during an actual operation. This assessment can occur prior to an actual operation.

Preferably the device is moveable relative to the artefact. Preferably, the device is moveable in the at least one linear and at least one rotational degree of freedom. Preferably the method comprises determining, from the geometric data, how the device can be oriented in the at least one rotational degree of freedom, along an interaction path so as to comply with one or more optimisation criteria.

Optionally, the method can comprise generating course of motion data describing the relative orientation of the device and artefact. The course of motion data can be used, for example, during an operation to control the relative orientation of a device and artefact whilst it is interacting with an artefact. Preferably, the data is used by a controller for automatically controlling the relative orientation of the device and artefact in accordance with the control of motion data. The data can comprise coordinate position information. The data can comprise data which can be used by a controller for determining the angle at which the device is to be positioned about the at least one rotational axis.

As will be understood, determining how the device and artefact can be relatively oriented along an interaction path so as to comply with one or more optimisation criteria can occur prior to an actual interaction operation beginning. Accordingly, this can occur as part of a planning stage of an operation. Optionally, this can be performed during an actual operation. Accordingly, the actual operation could begin before the entire course of motion is determined.

The method could comprise outputting the course of motion data. The course of motion data could be output to a controller of a positioning device on which a device or artefact can be mounted. The method could comprise storing the course of motion data in a memory device. The method could further comprise controlling the motion of at least one of a device and artefact mounted on a positioning apparatus according to the course of motion data. The generation of the course of motion data and the controlling the motion of at least one of a device and artefact according to the course of motion data could be performed by the same computer device. Optionally they are performed by separate computer devices. The method could comprise displaying the course of motion data. For instance the course of motion data could be displayed on a visual display unit.

The method can be used to determine a fixed orientation, that is an orientation which does not vary along the interaction path, so as to comply with one or more optimisation criteria. Preferably the method comprises determining how to manipulate the relative orientation between the device and artefact as they relatively move along the interaction path in order to comply with the one or more optimisation criteria. Accordingly, the method can be used to determine, prior to or during an operation, how to vary relative orientation of the device and artefact whilst the device and artefact relatively move along an interaction path. This is particularly useful when determining the course of motion for a device and artefact which can actively be relatively reoriented during movement along an interaction path. For example, this is particularly useful when determining the course of motion of a device and artefact that can be relatively reoriented without the need for interaction with a reorientation device.

Accordingly, preferably the relative orientation of the device and artefact is not to be fixed along the interaction path. Rather, preferably their relative orientation is to be varied dynamically along the interaction path.

As will be understood, geometric data can comprise dimension data. Geometric data can comprise shape data. Preferably the geometric data comprises three-dimensional ("3D") data. Accordingly, the geometric data can be 3D models of the artefact and device. Geometric data can comprise position data. The method can comprise retrieving the geometric data. For instance, the geometric data could be retrieved from a memory device. The geometric data could be obtained from a prior obtained measurement of a reference artefact. The geometric data could be generated by a user. For instance, the geometric data can be computer-aided design ("CAD") data. For example the geometric data can be a boundary representation of the artefact. Optionally, the geometric data is a polygonal model of the artefact. As will be understood, the received geometric data of the artefact and device can be combined in a common coordinate frame.

As will be understood the geometric data could be a true representation of what it is describing. Optionally, the geometric data could be an abstract representation of what it is describing. This is especially the case for the geometric data describing the device. For example, the device geometric data could be an abstract representation of the shape of the device. For instance, even though the device might be an irregular shape, the geometric data could describe the device using regular shape information. For instance, the geometric data could describe the device as one or more regular shapes. For example, the geometric data could describe the device as at least one sphere. For example, the geometric data could describe the device as at least one cylinder. Taking a contact measurement probe for a particular example, the probe head and/or body could for instance be represented as a sphere, the stylus as a cylinder and the tip as a sphere.

Preferably the method is for generating a course of motion of a device and artefact that are relatively moveable in at least two linear degrees of freedom, more preferably three linear degrees of freedom. Preferably the linear degrees of freedom are perpendicular to each other. Preferably the method is for generating a course of motion of a device and artefact that are relatively moveable in at least two rotational degrees of freedom. Preferably the at least two rotational degrees of freedom are about two substantially perpendicular axes. Devices which are moveable in three degrees of freedom and two rotational degrees of freedom are commonly referred to in the metrological industry as "five-axis" devices. Accordingly, the course of motion data can describe the relative orientation of the device and artefact about at least two axes. However, as will be understood, the invention is not limited to such systems and can be used to determine the course of motion of a device and artefact that are relatively moveable through much more degrees of freedom, for instance through three, four or more rotational and/or linear degrees of freedom.

The device could be a tool for machining the artefact. For instance, the tool could be a drilling, milling or grinding tool.

The device could be a measurement device. The measurement device could be a measurement probe. The measurement probe could be for measuring the dimensions of the artefact. Suitable measurement probes include contact probes. As will be understood, contact probes typically have a contact tip for interacting with the artefact to be measured. Contact between the tip and artefact being detectable by the measurement probe. Suitable measurement probes include touch-trigger probes and scanning probes. Suitable measurement probes also include non-contact probes. For instance, the measurement probe could be an inductance probe, a capacitance probe or an optical probe. In particular the measurement probe could be a camera probe.

The measurement device can comprise a surface sensor. This can be the part which interacts with the surface of the artefact in order to measure the artefact. As described below, the surface sensor could be a contact surface sensor or a non-contact surface sensor. The measurement device can comprise a body to which the surface sensor is attached. The surface sensor can be spaced apart from the body. For instance the surface sensor could be mounted toward the distal end of a stylus extending from the body. The body can be the part of the measurement device which is for mounting to a positioning device, for instance on a quill of a positioning device. The body can provide the at least one rotational degree of freedom. Optionally the at least one rotational degree of freedom is provided by the positioning apparatus. For instance the at least one rotational degree of freedom can be provided by a head on which the measurement device is mounted. Accordingly, the axis about which the at least one degree of freedom is provided can be distal to the surface sensor.

As will be understood the interaction path can, comprise the path the device takes during an operation. The interaction path could comprise a measurement path a measurement device takes during a measurement operation. Optionally, the interaction path could comprise a machining path a tool takes during a machining operation. The interaction path could be one sub-path of a plurality of sub-paths that when executed in sequence describes a whole interaction operation. The path could comprise position information only. Accordingly, the path could comprise no orientation information.

The interaction path can comprise the path the device takes during a operation whilst it is in an interacting relationship relative to the artefact. For instance, the interaction path can comprise the path a measurement device takes during a measurement operation whilst it is in a position sensing relationship relative to the artefact. Optionally, the interaction path can comprise the path a tool takes during a machining operation whilst it is machining (e.g. cutting, grinding or milling) the artefact. Accordingly, the method can comprise determining how to orient the device whilst interacting with the artefact. For instance, the method can comprise determining how to orient the device whilst obtaining measurement data about the artefact. The interaction path can comprise the path the device takes whilst moving more generally around the artefact. Accordingly, the interaction path can comprise the path the device takes between positions in which it is in an interacting relationship relative to the artefact. As will be understood, the interaction path could be the path on the artefact that is to be interacted with by the device. For example, the interaction path could be a path on the artefact that is to be measured. Optionally, the interaction path could be a path on the artefact that is to be machined, e.g. cut and/or milled.

As will be understood if, for example, the interaction path is a fixed path on the artefact, then it might be necessary to relatively reposition the artefact and device in the at least one linear degree of freedom in order to obtain the determined orientation. Accordingly, determining how the device and artefact can be oriented relative to each other can comprise determining the relative position of the device and artefact in the at least one linear degree of freedom.

The method could comprise obtaining the data representing the interaction path. The interaction path could be input by the user. Accordingly, the method could comprise receiving an interaction path from a user interface device. The interaction path could be predetermined for the artefact to be measured. That is the interaction path could be determined prior to execution of the method of the invention. Accordingly, the method could comprise retrieving the interaction path. The interaction path could be retrieved from a memory device.

Optionally, the interaction path could be generated from geometric data. The method could comprise generating the interaction path from the geometric data.

The interaction path data could comprise a plurality of points. For instance, a interaction path could comprise a plurality of points on the artefact which are to be interacted with. For instance, a measurement path could comprise a plurality of points on the artefact which are to be measured. The points could be discrete points. Optionally the interaction path data could comprise a line, dimension, degree of freedom or the like. For instance, the measurement path data could comprise a line, dimension, degree of freedom or the like along which measurements are to be taken. For instance the interaction path could comprise vector data. Optionally, the interaction path could be defined as a curve between two points.

Suitable optimisation criteria for use with the present invention can include criteria relating to the performance of an interaction operation. Accordingly, the method can comprise determining how the relative orientation of the device and artefact can be manipulated during movement of the device along an interaction path in order to meet one or more performance criteria. Performance criteria can comprise a speed of interaction. For instance, performance criteria can comprise a speed of measurement or speed of machining. Performance criteria can comprise interaction path length. Performance criteria can comprise predetermined acceleration level. The predetermined acceleration level can relate to the acceleration of the device. The predetermined acceleration level can comprise a maximum acceleration. Performance criteria can comprise the direction of motion. Performance criteria can comprise ensuring minimum movement of the positioning apparatus which controls the translational movement of the device and/or artefact through the measurement volume. Performance criteria can comprise maintaining a predetermined relative orientation between the device and the artefact being measured. Performance criteria can comprise ensuring that the device is dragged along the interaction path. For instance, performance criteria can comprise ensuring that the measurement device is dragged along the measurement path. This can be for instance when the measurement device's surface sensor trails the point at which the measurement device is mounted to the positioning apparatus. This can be as opposed to the measurement device being pushed along the measurement path.

Suitable optimisation criteria for use with the present invention can optionally comprise criteria relating to the boundaries of motion. For instance, optimisation criteria can comprise that the course of motion ensures collision free movement. This can comprise collision free movement between the device and the artefact. Accordingly, the method can comprise determining how the device and artefact can be oriented relative to each other along an interaction path in order to avoid collision between the device and the artefact.

This can also comprise collision free movement between any other relatively moveable objects located in the device's movement volume. For instance, this can comprise collision free movements of the part which effects relative movement of the device and artefact. Accordingly, the method can further comprise receiving geometric data relating to objects that will be located in the device's movement volume during an operation. Such an object could be a rack for storing the device. Such an object could be a calibration device, such as an object used to calibrate the device. Such an object could be one that is used to reorient the device. Such an object can include fixture devices used for positioning the artefact. Such an object could be another artefact. Such an object could be a positioning apparatus, such as the positioning apparatus on which the device is mounted.

As will be understood, in embodiments in which the device is moveable, a collision can comprise unwanted contact between the device and the artefact or any other object located in the device's movement space. Further, in embodiments in which the artefact is moveable, a collision can comprise unwanted contact between the artefact and the device or any other object located in the artefact's movement space. In embodiments in which the device is a non-contact measurement device a collision could comprise any contact between the non-contact measurement device and the artefact or any other object.

In embodiments in which the device has a contact part which is intended for contact with the artefact during the operation, a collision could comprise contact between any part of the device other than the contact part and the artefact. This could also comprise unintended contact between the contact part and the artefact, for example, contact between the contact part and a part of the artefact that isn't to be interacted with. For example, in embodiments in which the measurement device is a contact probe having a sensing tip a collision could comprise contact between any part of the measurement device other than the sensing tip and the artefact. This could also comprise unintended contact between the sensing tip and the artefact which is being measured, for example, contact between the sensing tip and a part of the artefact that isn't being measured.

A collision can be determined by identifying any undesirable intersection between geometric data representing different components. For example, a collision can be determined by identifying any undesirable intersection between geometric data representing the device and geometric data describing other parts, for instance the artefact, in the device's movement volume. As will be understood in embodiments in which the device comprises an artefact contact part, such as a surface sensor, some intersection can be allowed. For instance, intersection between geometric data representing the artefact contact part and the point on the artefact that is to be interacted with can be allowed. However, all other intersections can be undesirable.

The method can comprise for each of a plurality of points along the interaction path determining a plurality of relative orientations between the device and artefact. The method can further comprise for each of a plurality of points along the interaction path selecting collision free orientations only. The method can further comprise selecting from collision free orientations those orientations which comply with one or more other optimisation criteria. The method can comprise determining the cost associated with the movement between a pair of points along the interaction path. The cost could depend on the relative orientation of the device and artefact at the pair of points. Accordingly, the method can comprise determining the cost of movement between a pair of points having a first orientation combination. The method can further comprise determining the cost of movement between the same pair of points having a second orientation combination. As will be understood, the orientation combination of a pair of points describes the relative orientation of the device and artefact at first and second points along the interaction path. The relative orientation of the device and artefact at the first and second points can be the same or can be different. Preferably, the orientation of the device at at least one of the first and second points is different in the second orientation combination to the first orientation combination. The method can comprise selecting the orientation combination having the lowest cost.

This method can comprise determining the cost for a plurality of pairs of points along the interaction path. The method can comprise selecting those orientations in which the total cost along the interaction path complies with predetermined criteria. The predetermined criteria could be selecting the interaction path having the minimum cost.

As will be understood, the cost of movement can be a value which represents a property of the movement between the two points. For instance the property could be speed. The property could be time. The property could be distance. The property could be acceleration. The cost could be a combination of two or more of the above mentioned properties. Optionally, the cost property could be input by a user.

The method can comprise determining a plurality of different possible courses of motion, each describing how the orientation of the measurement device can be controlled along the interaction path. The method can comprise selecting at least one course of motion from the plurality of course of motions which comply with the one or more optimisation criteria. The selected at least one course of motion can be that which complies with the optimisation criteria. Optionally, the selected at least one course of motion can be that which best complies with at least one of the one or more optimisation criteria. For instance, the selected at least one course of motion could be that which ensures collision free movement. The selected at least one course of motion could be that which ensures minimum device acceleration. The selected at least one course of motion could be that which ensures minimum interaction duration. The selected at least one course of motion could be that which complies with one or more of the above mentioned criteria.

The method can comprise receiving optimisation criteria. The optimisation criteria can be determined and input by a user. Optionally, the method can comprise receiving rules input by a user, and determining the optimisation criteria based on those rules. The method can comprise determining the optimisation criteria from the application of rules and logic to geometric data.

As will be understood, the interaction path might cover a portion of the artefact. Optionally, the interaction path could cover substantially the whole of the artefact. In this case the interaction path could comprise a plurality of sub-paths.

The method can comprise receiving an instruction to measure at least one portion of the artefact. The instruction can be received from a user interface device. Accordingly, the instruction can be input by a user. This enables a user to select which portions of an artefact are to be measured.

According to a second aspect of the invention there is provided computer program code comprising instructions which, when executed by a computer causes the computer to perform the above described method.

According to a third aspect of the invention there is provided a computer readable medium, bearing computer program code as described above.

According to a fourth aspect of the invention there is provided a computer comprising: a processor; and a memory, wherein at least one of the processor and memory is adapted to perform the above described method.

According to a further aspect of the invention there is provided a method of generating a path along which a measurement apparatus will move when measuring a part, using a geometric model of the part, the method comprising: (a) generating a plurality of points on a surface of the geometric model of the part; (b) generating multiple orientations of the measurement apparatus for measurement of each point; (c) generating an optimised path for the measurement apparatus, determining position and orientation, for measurement of the plurality of points. Preferably the geometric model is a CAD model, for example a boundary representation or a polygonal model. The multiple orientations of the measurement apparatus for measurement of each point generated in step (b) may be a discrete set or functionally derived. In a preferred embodiment, the geometric model of the part is combined with a geometric model of the measurement apparatus and coordinate positioning apparatus. For each orientation of the measurement apparatus in step (c), it is determined whether there is a collision between the measurement apparatus or coordinate positioning apparatus and part. Only those collision free orientations of the measurement apparatus and coordinate positioning apparatus are used to generate the optimised path. The measurement apparatus may comprise a measurement probe. A measurement probe may comprise a contact measuring probe with a stylus having a workpiece contacting tip. A measurement probe may comprise a non contact probe, for example an optical, inductance or capacitance probe. The measurement apparatus may comprise a camera. Preferably the measurement apparatus is mounted on a coordinate positioning apparatus. The coordinate positioning apparatus may comprise apparatus which enables both the position and orientation of the measurement apparatus mounted on it to be varied. The coordinate positioning apparatus may comprise several components, for example an articulating probe head which provides rotational motion about two or more axes mounted on a coordinate positioning apparatus, such as a coordinate measuring machine (CMM). The coordinate positioning apparatus may comprise a single component, for example a manual coordinate measuring arm, a robotic arm, or the like. The path in step (c) may be optimised for criteria such as speed of measurement, path length, acceleration constraints of the coordinate positioning apparatus, etc.

A yet further aspect of the invention provides a computer programme for generating a path along which a measurement apparatus will move when measuring a part, the computer programme comprising code adapted to perform the following steps when executed on a computer: (a) inputting a geometric model of a part; (b) generating a plurality of points on a surface of the geometric model of the part; (c) generating multiple orientations of the measurement apparatus for measurement of each point; (d) generating an optimised path for the measurement apparatus, determining position and orientation, for measurement of the plurality of points. Preferably the computer programme is provided on a carrier, such as a CD, USB stick or other medium, which when loaded into a computer carries out the invention. The computer program may also be downloaded directly from the internet. The computer programme may have the additional step of outputting the optimised path, displaying the optimised path or storing the optimised path in memory.

Preferred embodiments of the present invention will be illustrated by way of example with reference to the accompanying drawings, where:

Figure 6C:
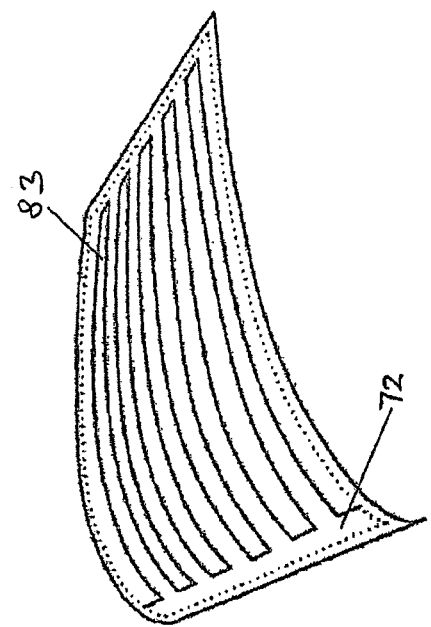
Figure 6A:
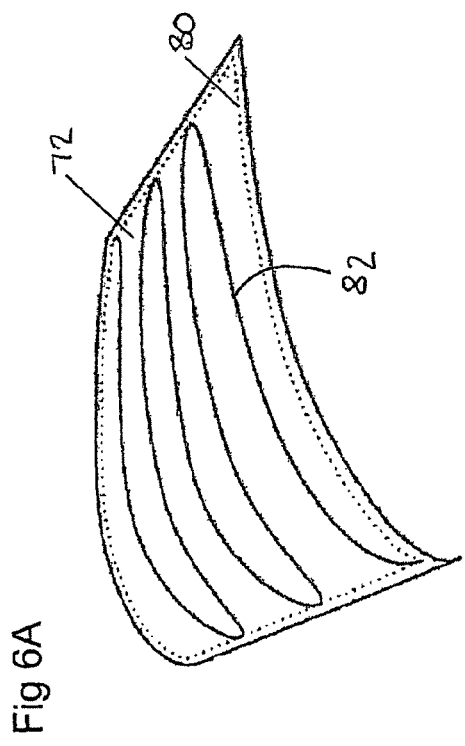
Figure 6B:
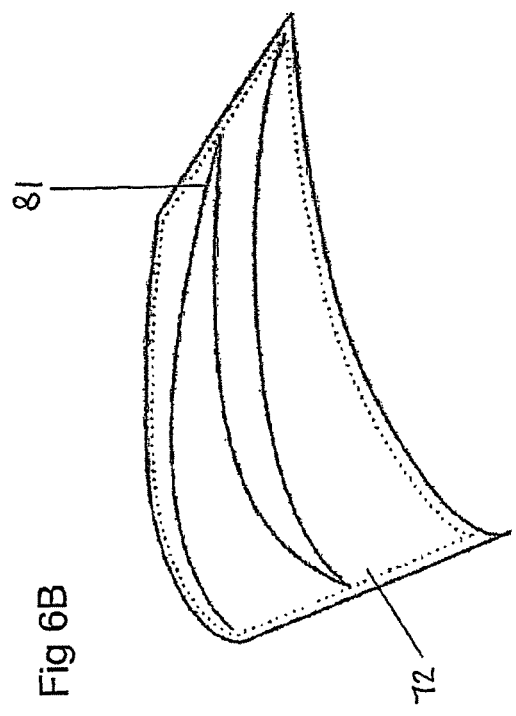
Figure 7:
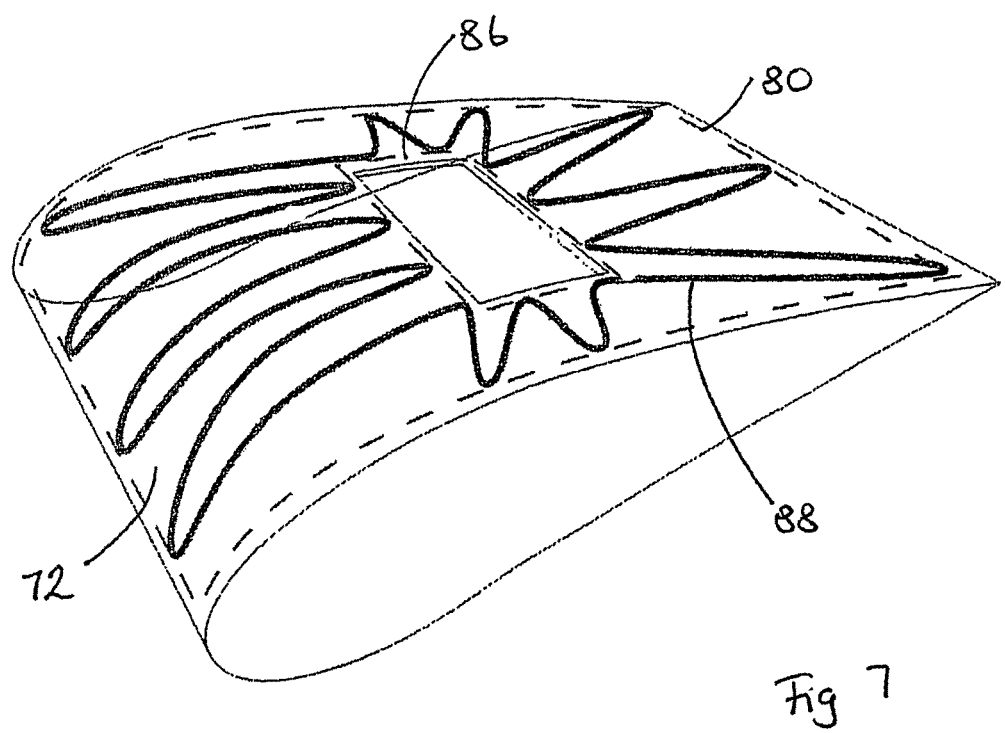
Figure 9:
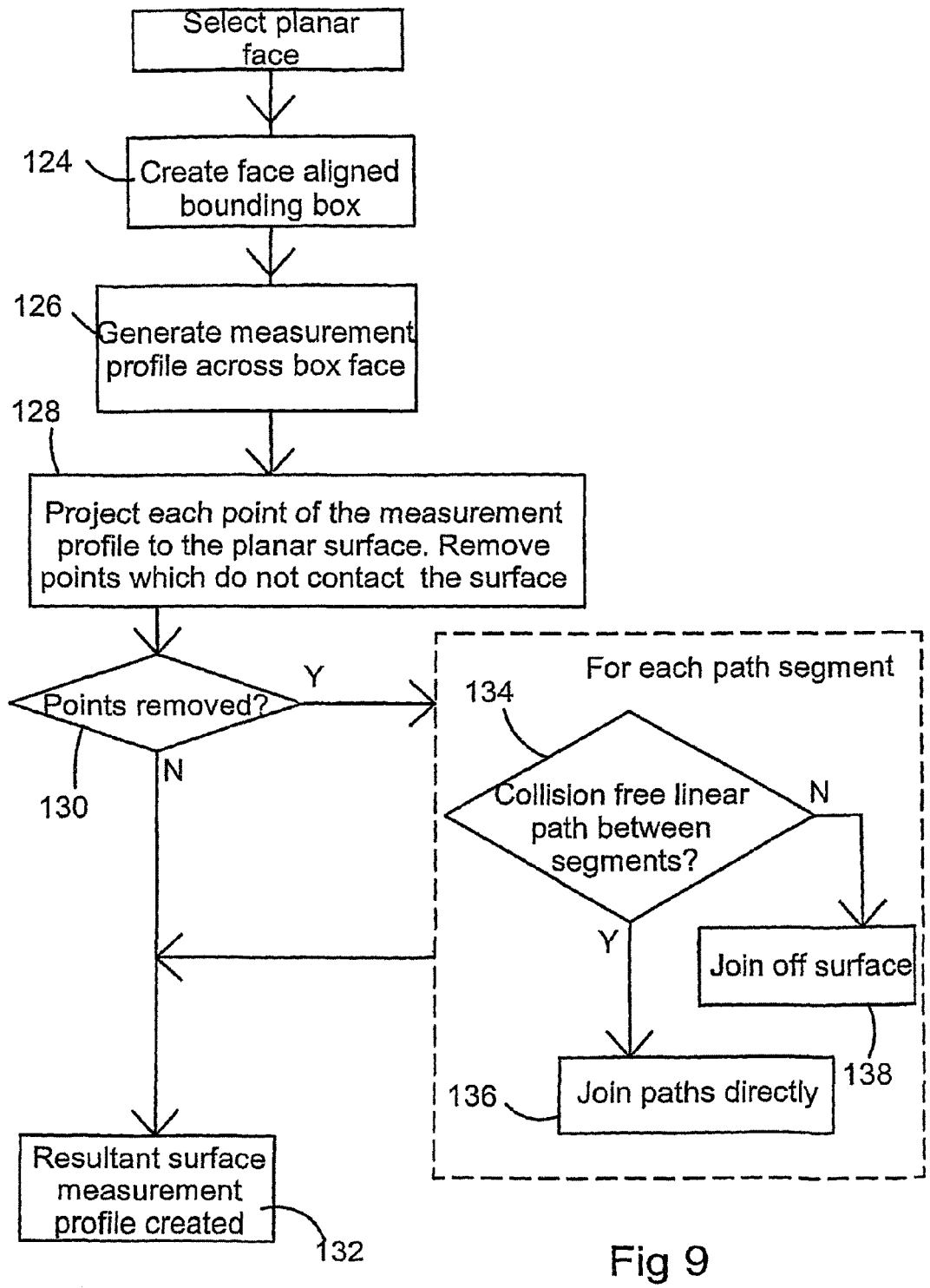
Figure 10:
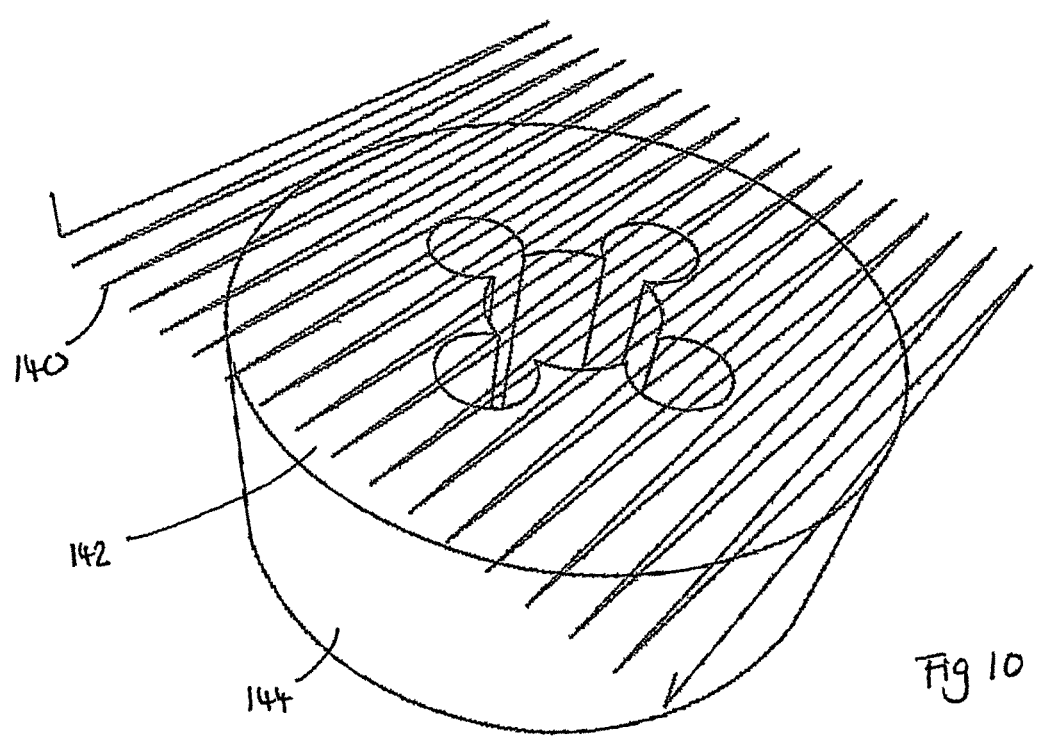
Figure 11:
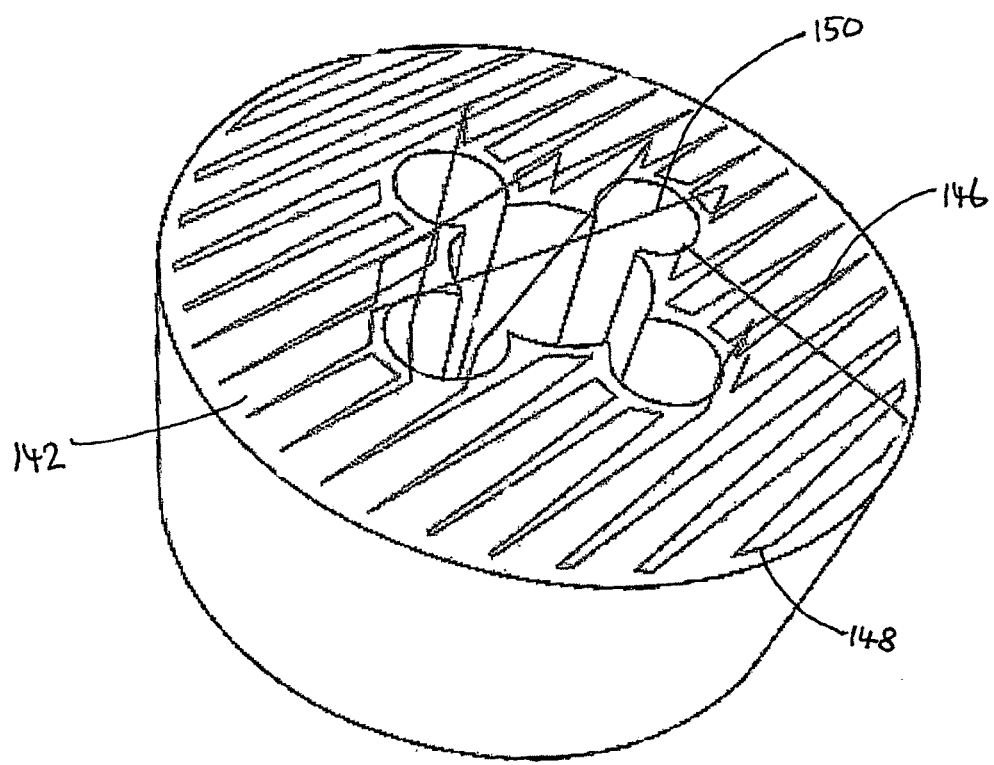
Figure 12:
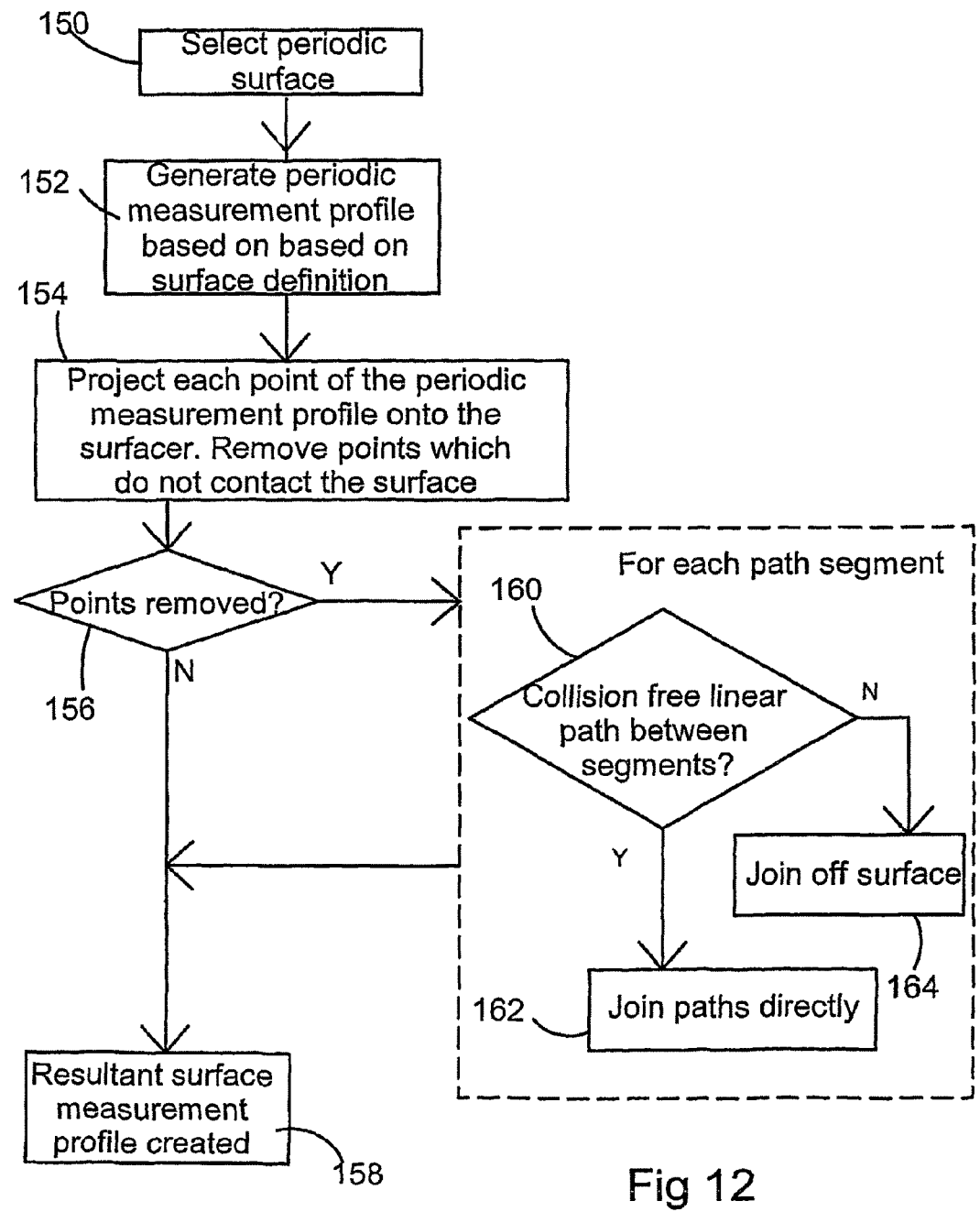
Figure 13A:
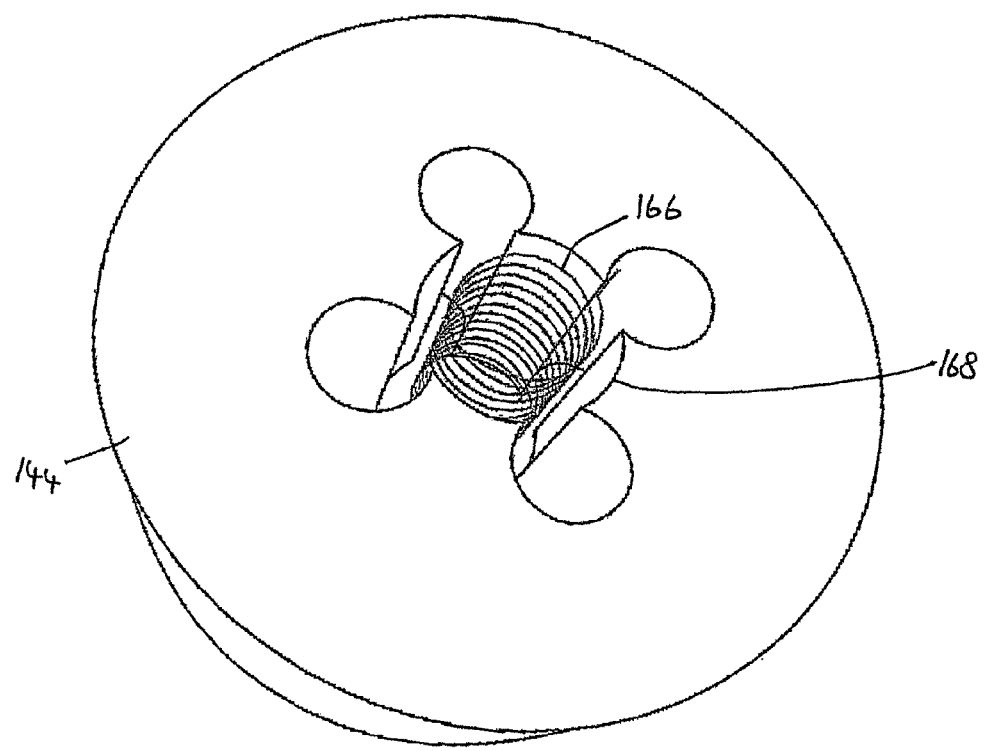
Figure 13B:
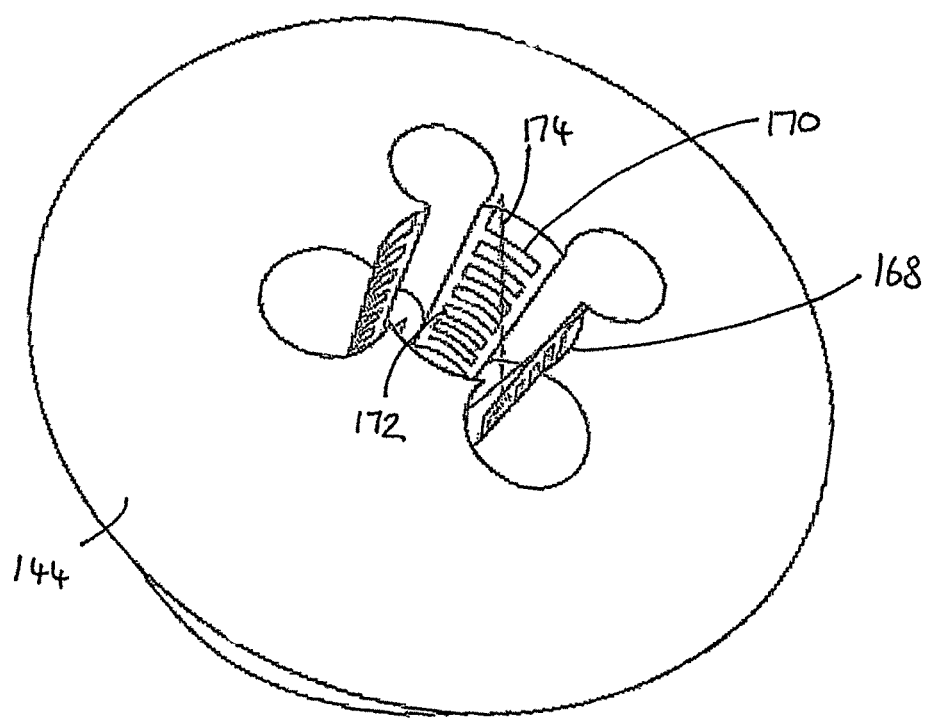
Figure 14:
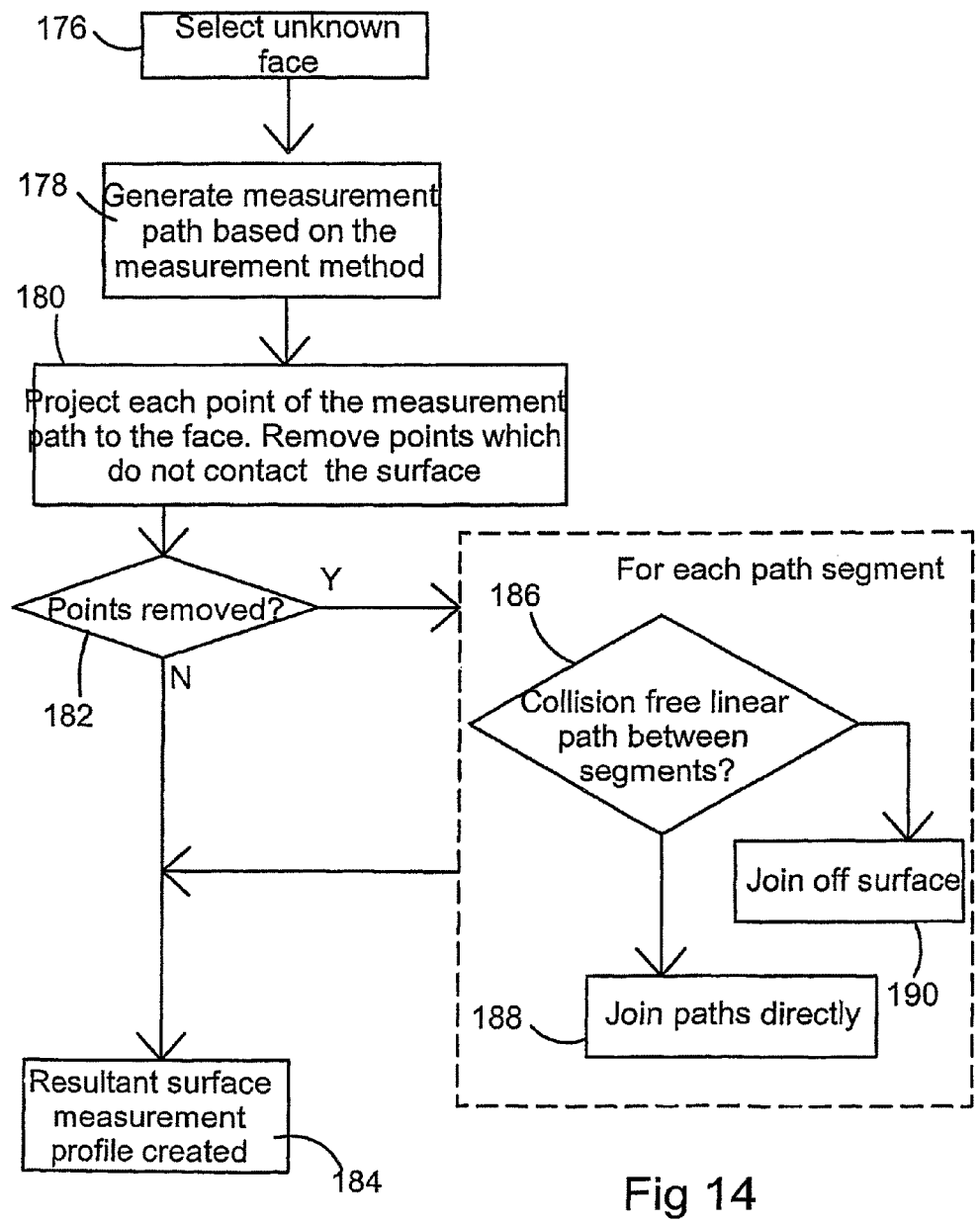
Figure 15:
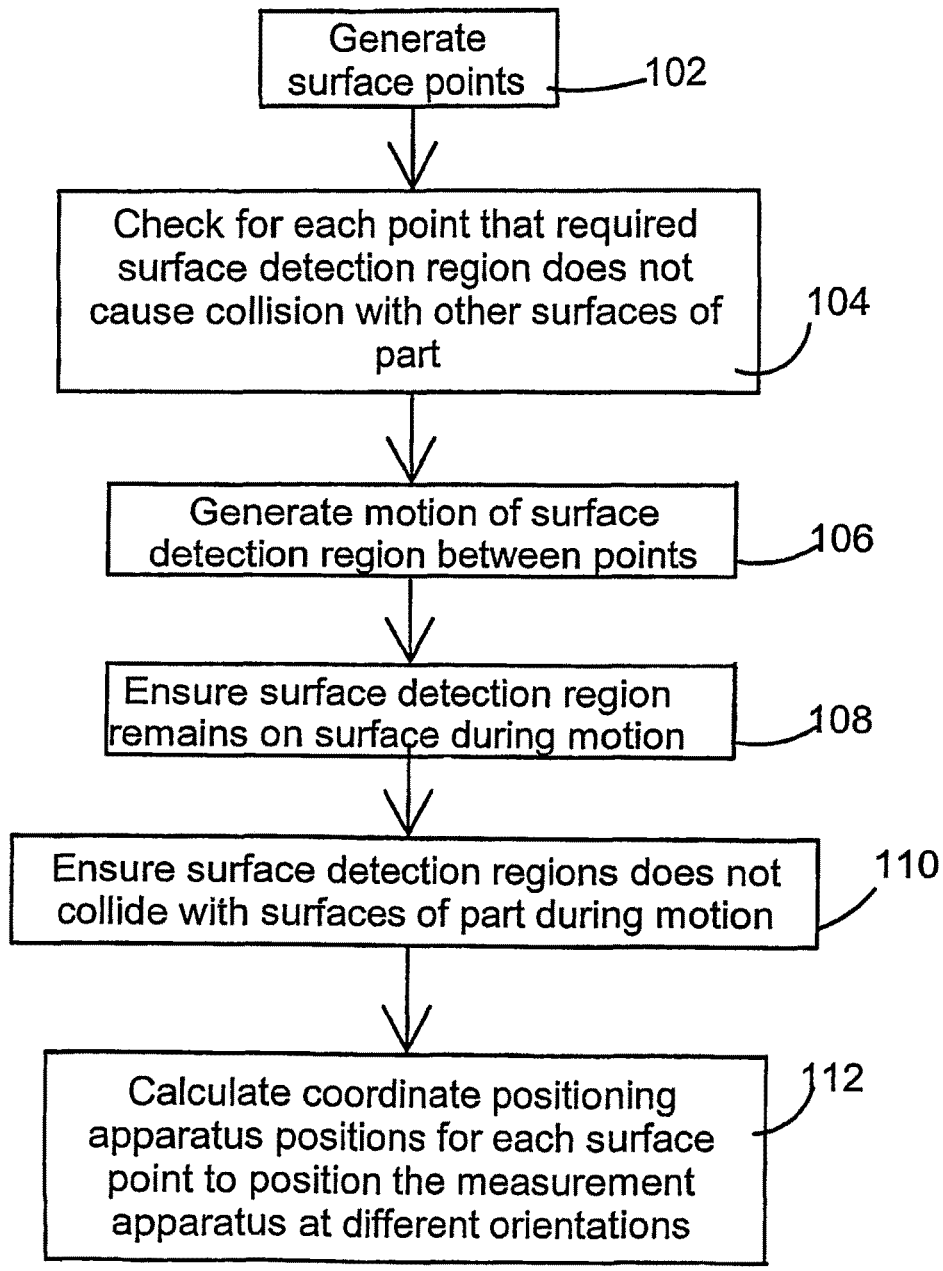
Figure 16:
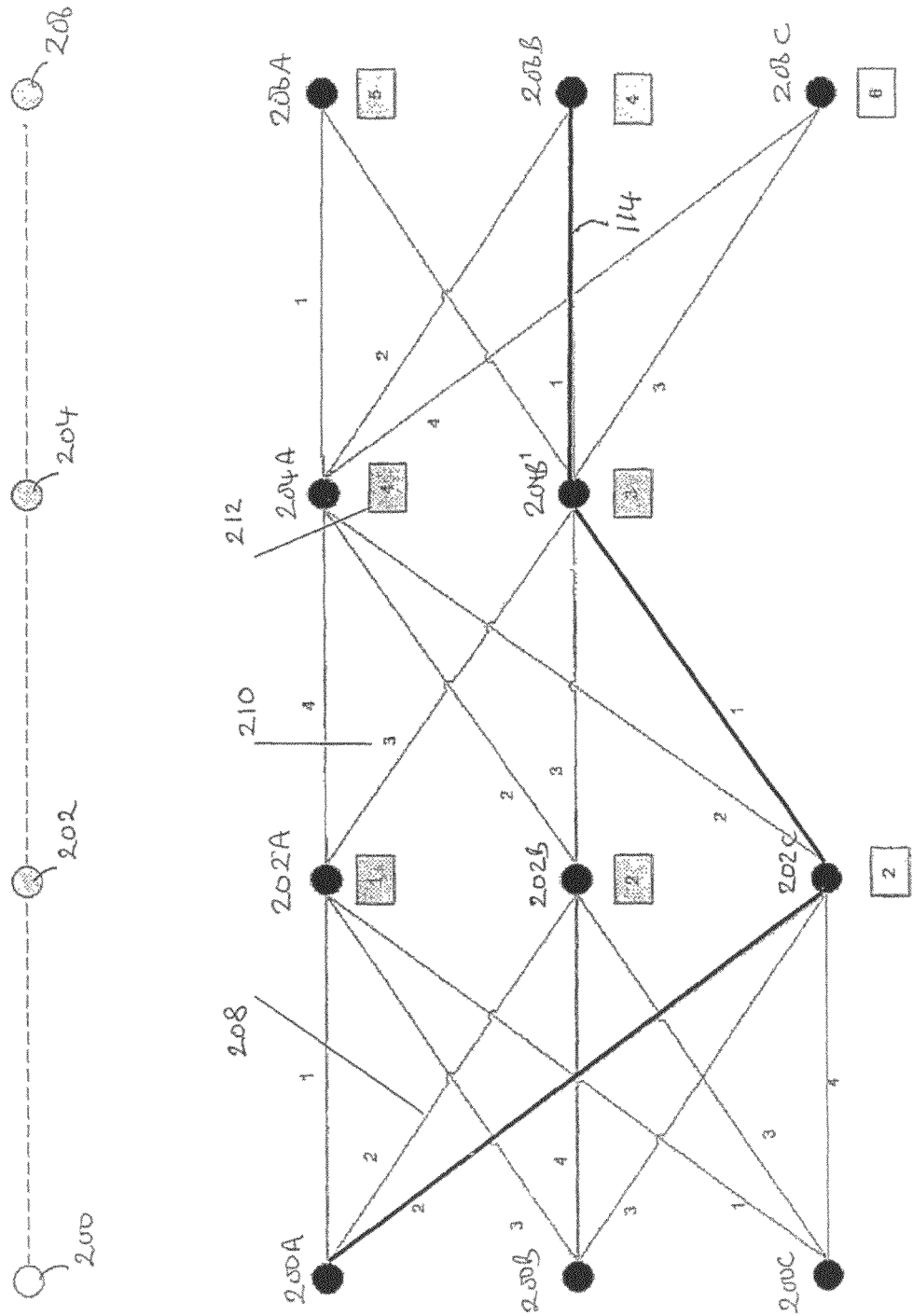
Figure 17:
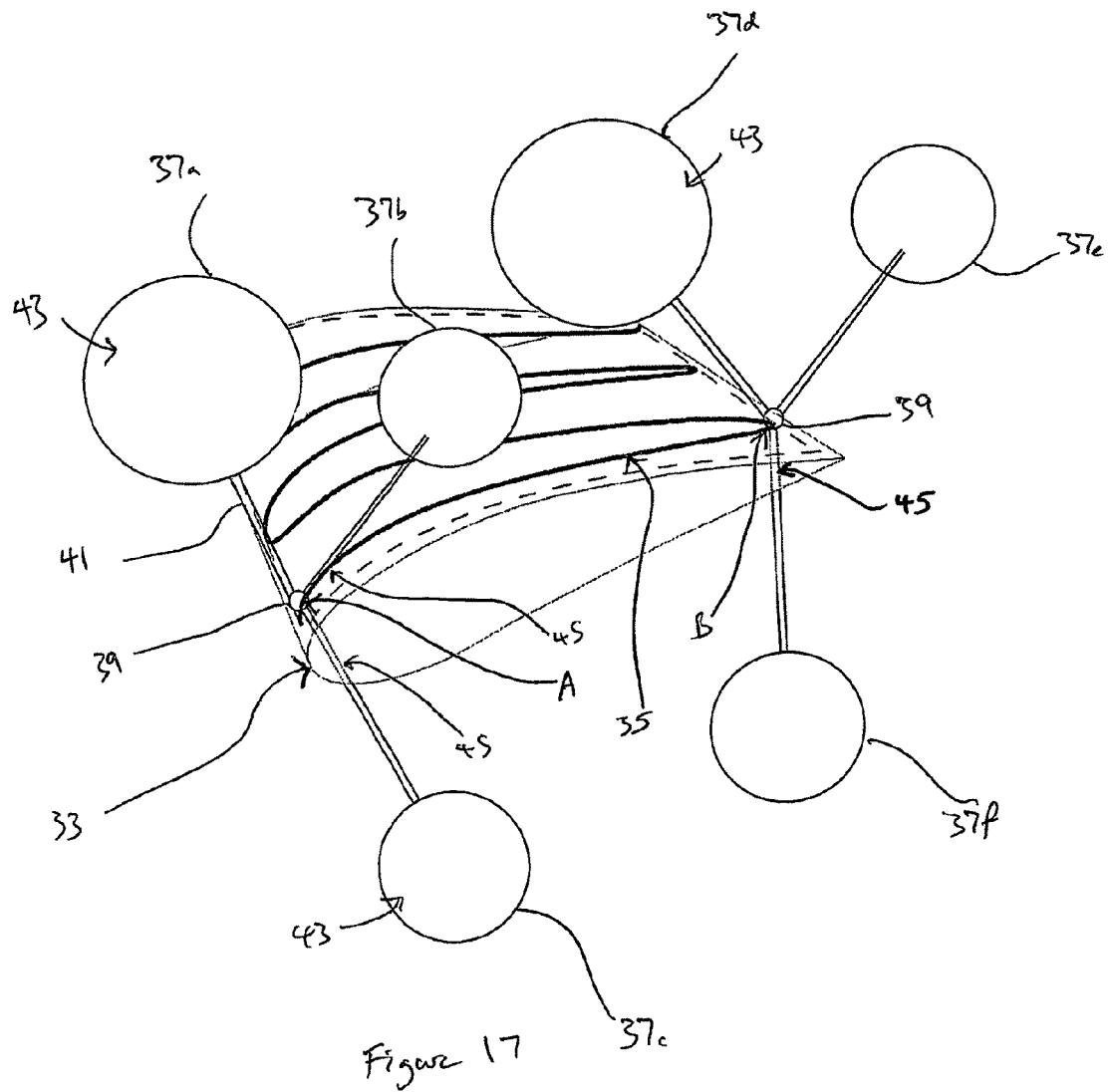
Figure 18:
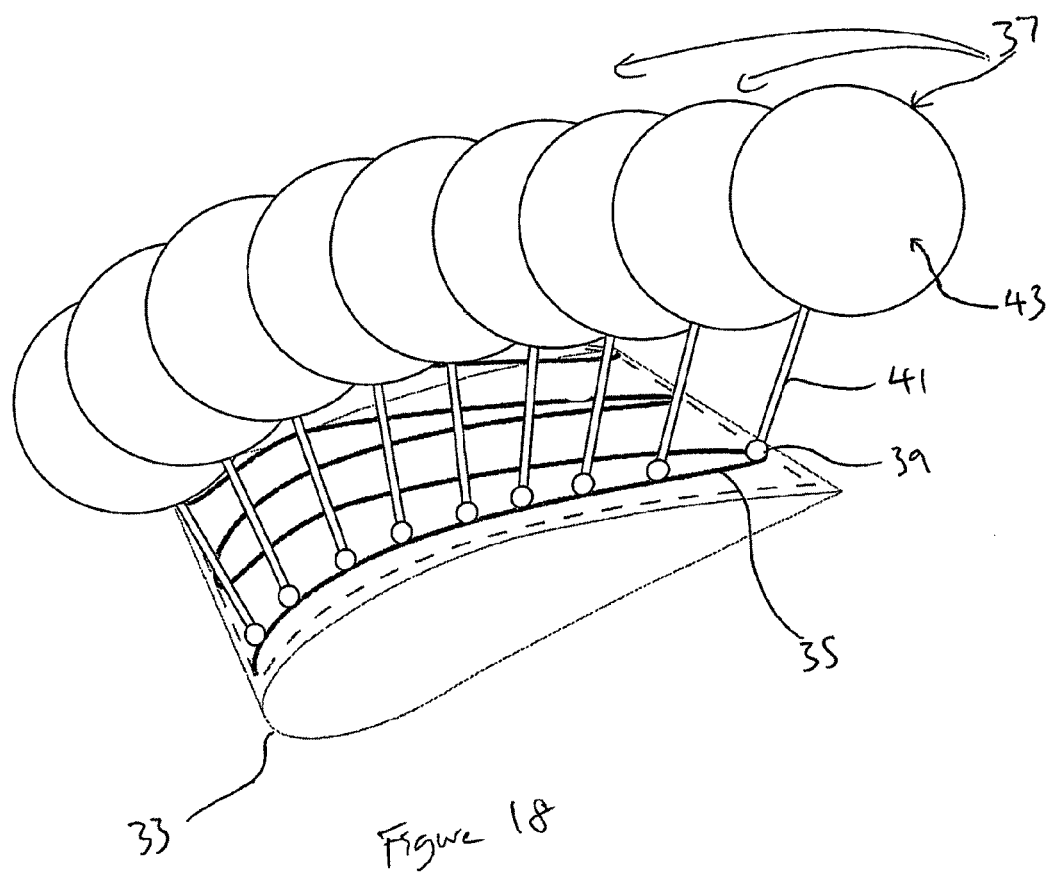

FIGS. 6A-C illustrate curvilinear measurement profile based on a sinewave, sharks tooth and square wave profile respectively on a NURBS surface;

FIG. 7 illustrates a curvilinear measurement profile for a two loop surface;

FIGS. 8A-8D illustrate different curvilinear measurement profiles for a three loop non periodic surface;

FIG. 9 is a flow diagram for an alternative method of creating a measurement profile on a planar surface;

FIG. 10 illustrates a sine-wave curvilinear measurement profile parallel but offset from a planar surface of a cylinder;

FIG. 11 illustrates the cylinder of FIG. 10 with the measurement profile projected onto its planar surface;

FIG. 12 is a flow diagram for generating a surface profile on a cylindrical surface;

FIG. 13A illustrates a helical measurement profile plotted inside an internal bore of cylinder;

FIG. 13B illustrates a helical measurement profile projected onto the surface of the internal bore of FIG. 13A;

FIG. 14 is a flow diagram for generating a surface measurement profile on a general face;

FIG. 15 is a flow diagram of, a method of generating multiple orientations of the measurement apparatus for each point;

FIG. 16 illustrates the application of Dijkstra's algorithm to the generation of an optimised path;

FIG. 17 is a schematically illustrates the calculation of various orientations of a measurement probe relative to an artefact to be measured along a measurement path; and FIG. 18 is a schematic illustration of the determined orientation of the a measurement probe relative to an artefact along a measurement path.

Figure 1:
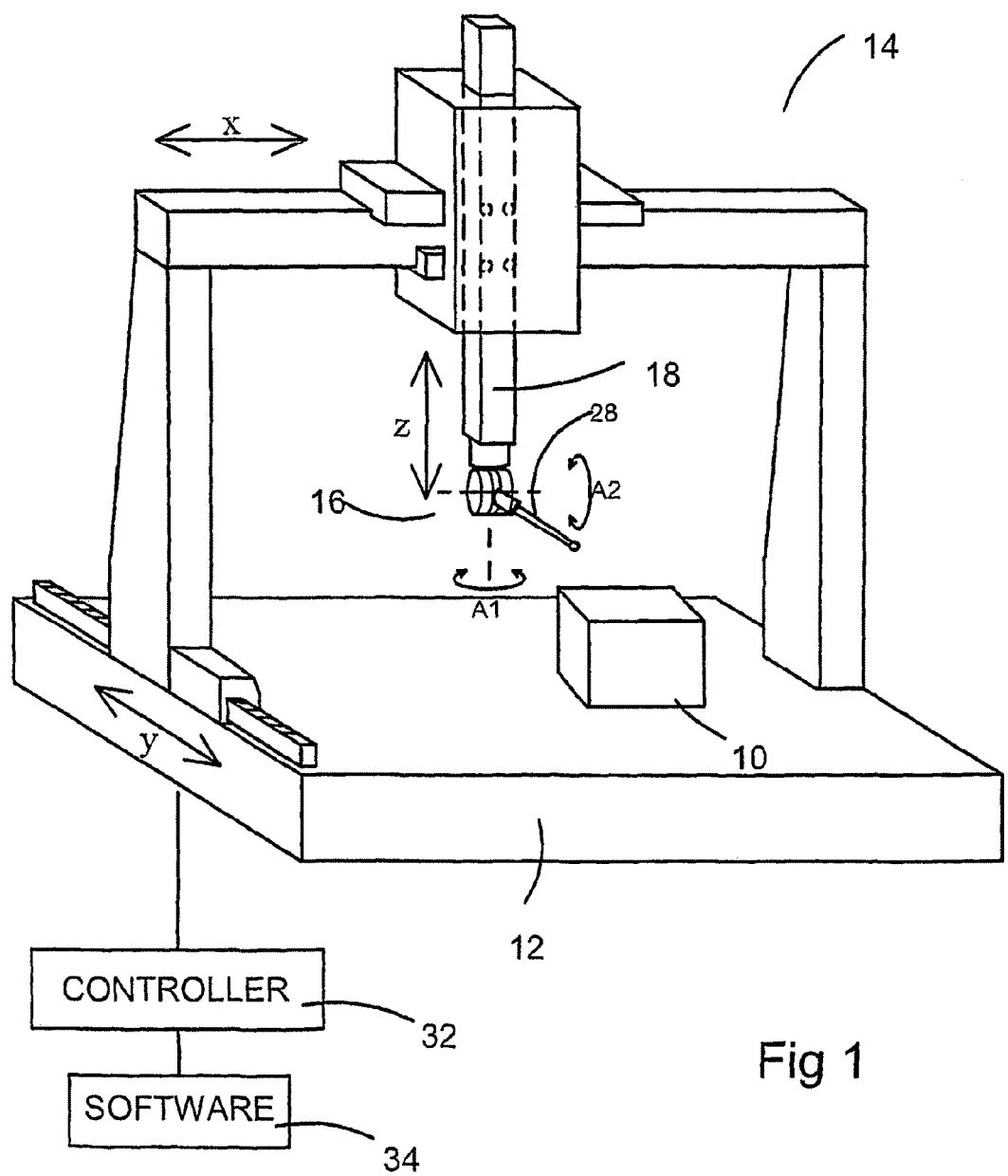
FIG. 1 illustrates a CMM on which a workpiece is mounted.

FIG. 1 illustrates measurement apparatus, in the form of a measurement probe 28 mounted on a coordinate positioning apparatus. In this embodiment, the coordinate positioning apparatus comprises an articulating probe head 16 mounted on a CMM 14. A workpiece 10 to be measured is mounted on a table 12 of the CMM 14 and an articulating probe head 16 is mounted on a quill 18 of the CMM 14. The quill is driveable in three directions X, Y, Z relative to the table by motors in a known manner. The CMM is provided by motors and transducers to provide and measure motion in each axis. This arrangement is described further in international patent application no. WO90/07097. The articulating probe head enables a probe or stylus mounted on the articulating probe head to be rotated about two orthogonal axes. Thus a probe or stylus mounted on the articulating probe head may be angularly oriented about these two axes whilst the articulating probe head can be positioned by the coordinate positioning machine in any position within the working volume of the machine. Such an articulating probe head provides a coordinate positioning machine with greater scanning flexibility because the articulating probe head can position the probe or stylus in many different orientations.

Figure 2:
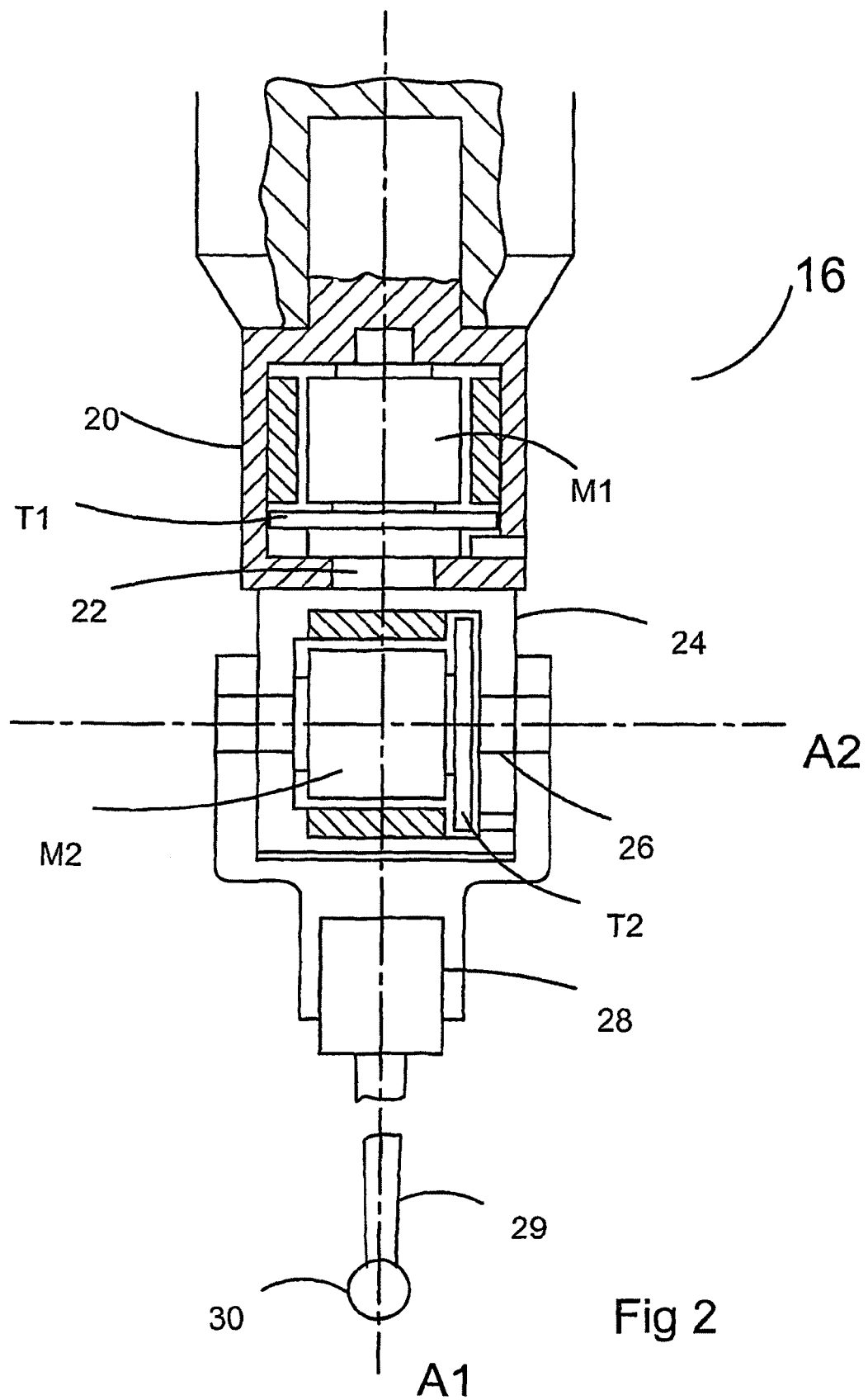
FIG. 2 illustrates an articulated scanning head for mounting on the CMM of FIG. 1.

As illustrated in FIG. 2, the articulating probe head 16 comprises a fixed part formed by a base or housing 20 supporting a movable part in the form of a shaft 22 rotatable by a motor M1 relative to the housing 20 about an axis A1. The shaft 22 is secured to a further housing 24 which in turn supports a shaft 26 rotatable by a motor M2 relative to the housing 24 about an axis A2 perpendicular to the axis A1.

A probe 28 with a stylus 29 having a workpiece contacting tip 30 is mounted onto the articulating probe head. The arrangement is such that the motors M1, M2 of the articulating probe head can position the workpiece-contacting tip angularly about the axes A1 or A2 and the motors of the CMM can position the articulating probe head linearly anywhere within the three-dimensional coordinate framework of the CMM to bring the stylus tip into a predetermined relationship with the surface being scanned.

Linear position transducers (not shown) are provided on the CMM for measuring linear displacement of the articulating probe head and angular position transducers T1 and T2 are provided in the articulating probe head for measuring angular displacement of the stylus about the respective axes A1 and A2.

A measurement controller 32 sends drive signals to the motors of the coordinate positioning apparatus (e.g. CMM and articulating probe head) to control their motion and receives inputs from the transducers of the coordinate positioning apparatus (e.g. CMM and articulating probe head) and measurement apparatus (e.g. measurement probe). The controller 32 may be a bespoke device or software on a computer.

The measurement apparatus may be a measurement probe, such as a contact probe having a stylus with a workpiece contacting tip. Known types of contact probe include a touch trigger probe, in which deflection of the stylus causes an output which latches the position of the coordinate positioning apparatus at which the trigger occurred. Another type of known contact probe is a scanning probe, in which transducers in the probe measure the amount of stylus deflection. The measurement apparatus can also include non contact probes (e.g. optical, capacitance and inductance probes) and devices such as cameras.

When a workpiece is to be measured, a course of motion which is to be followed by the measurement apparatus must be programmed.

The course of motion is planned in software 34 which communicates with the measurement controller 32. The measurement controller and software may be run on the same device (i.e. the same PC, machine controller or bespoke device) or be separate devices.

An overview of the course of motion planning method will now be described with reference to FIG. 3. In a first step a geometric model of a workpiece, such as a CAD model, is loaded into the path planning software 40. The model may for example comprise a boundary representation (B-Rep) or a polygonal model, as described in more detail in the embodiments below. A part co-ordinate system is created for the geometric model and this is aligned with the coordinate system of the coordinate positioning apparatus which will be used to measure the workpiece 42. In this way, the model is placed virtually on the table of the coordinate positioning apparatus.

The software allows the user to select one or more surfaces of the geometric model to be measured 44. The use of a CAD model enables a list of faces of the model to be displayed, which can be selected and/or de-selected for inclusion in a measurement plan. A B-Rep model already has defined faces, whereas these faces must first be created from a non parameterised model, such as a polygonal model.

Once a surface of the geometric model has been selected, multiple points on each surface are generated 46. These points are locations at which measurements will be taken using the measurement apparatus and are part of the measurement path. The multiple points may be received as part of a surface measurement profile, individually selected by a user or automatically generated by the software 34 based on the geometric model of the surface as described in more detail below.

For each surface point, the software 34 generates multiple possible orientations and/or positions of the measurement apparatus which allow the measurement of the surface point to be taken 48.

The software then generates an optimised path for the measurement apparatus to follow, enabling measurement of each of the surface points 50. This measurement path may be optimised for difference factors, for example for speed, distance, acceleration constraints etc.

The step of automatically generating multiple measurement points on a selected surface that make up the measurement path will now be described in more detail, referring to the flow diagram of FIG. 4. The measurement path is also commonly referred to as a measurement profile.

The surface parameters of the selected surface are determined 54, which gives information such as whether the surface is periodic or has loops. This method is particularly suitable if the geometric model is in the form of B-Rep, as the surface parameters are included in the model.

Once the surface parameters of the selected surface have been determined, the surface can be identified as a particular surface type and a measurement profile suitable for that surface type can be generated on the surface.

Figure 4:
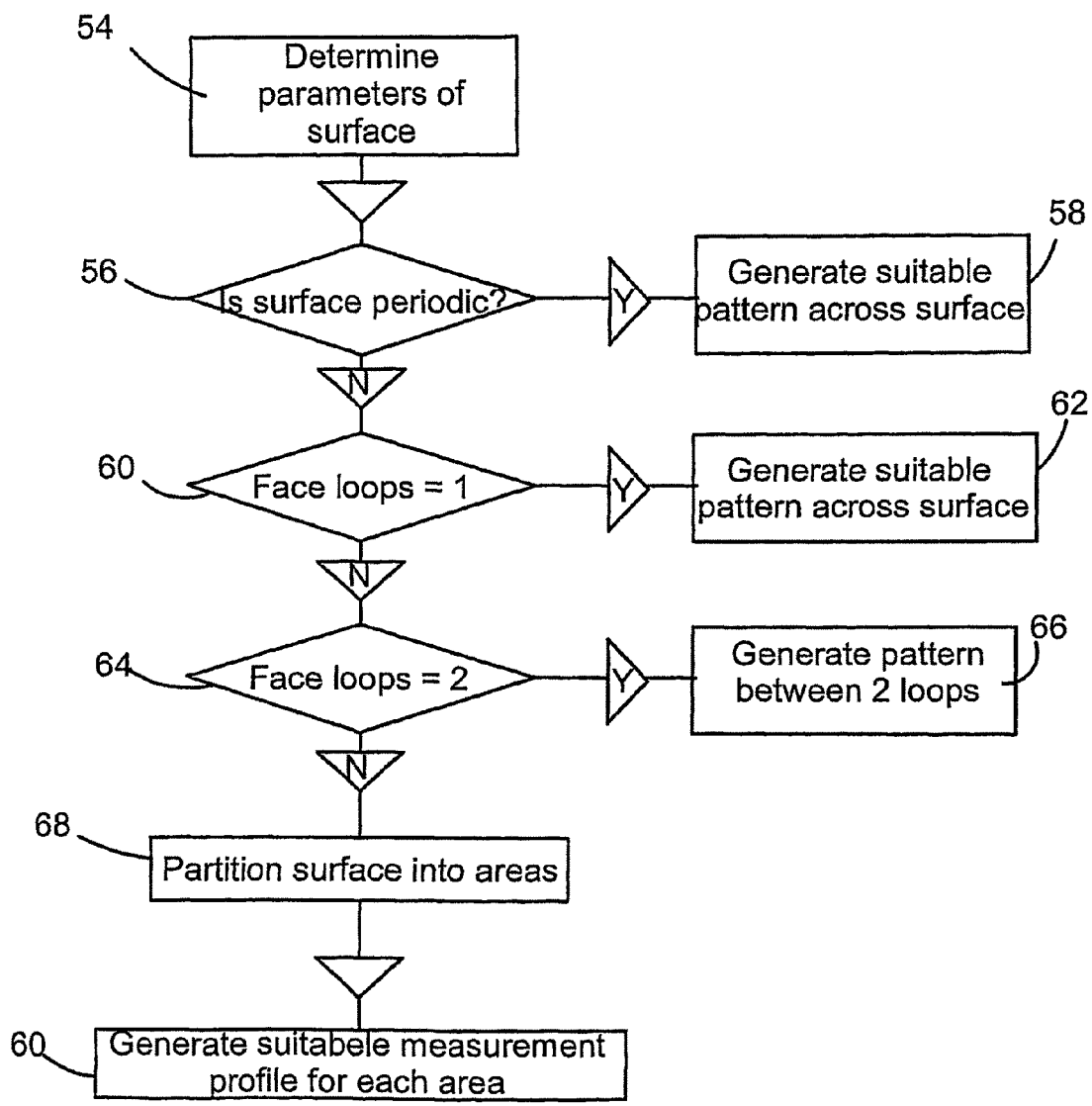
FIG. 4 is a flow diagram of a method of generating multiple points on a selected surface.

The flow diagram in FIG. 4 shows one method of generating a measurement path according to surface type.

It is determined from the surface parameters of the selected surface whether the surface is periodic 56. If the surface is periodic, a measurement path suitable for the periodic surface is chosen 58, e.g. a helical pattern for a cylindrical surface. Where more than one measurement path is available, a default measurement path may be applied or the user may be allowed to select the measurement path of their choice for a surface.

Figure 5:
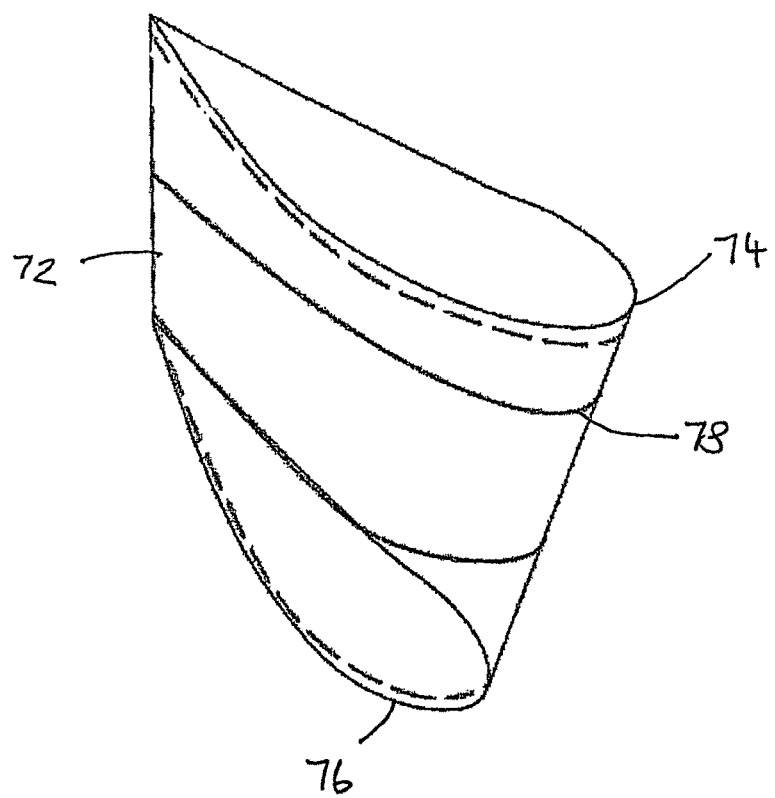
FIG. 5 illustrates a helical measurement profile on a periodic surface.

FIG. 5 illustrates a turbine blade 72 having a periodic surface between loop boundaries 74,76. A loop is a circuit of edge bounding a face. A helical measurement path 78 is shown.

If the surface is non periodic, it is determined how many face loops the surface has. A loop is a B-Rep term for a closed edge. Different measurement paths can be generated, depending on whether there are one, two or more loops. FIG. 4 illustrates that for a surface having one loop 60, a suitable measurement path is generated 62, for example a single curvilinear measurement path based on a sine-wave.

FIGS. 6A-C illustrate measurement path on a typical NURBS (Non-uniform, rational B-spline) surface 72, for example a face of a turbine blade. The surface has a single loop with a loop boundary 80. In FIG. 6A, a curvilinear measurement path based on a sine-wave 82 is shown. FIG. 6B shows a curvilinear measurement path based on a 'sharks tooth' 81 and FIG. 6B shows a measurement path based on a square wave 83. Alternative curvilinear profiles may also be used.

FIG. 4 illustrates that for a face having two loops 64, a suitable measurement path is generated between the two loops 66. FIG. 7 illustrates a typical NURBS surface 72, (e.g. a face of a turbine blade) with two loop boundaries 80,86. A curvilinear measurement path 88 is shown between the loop boundaries.

Figure 8A:
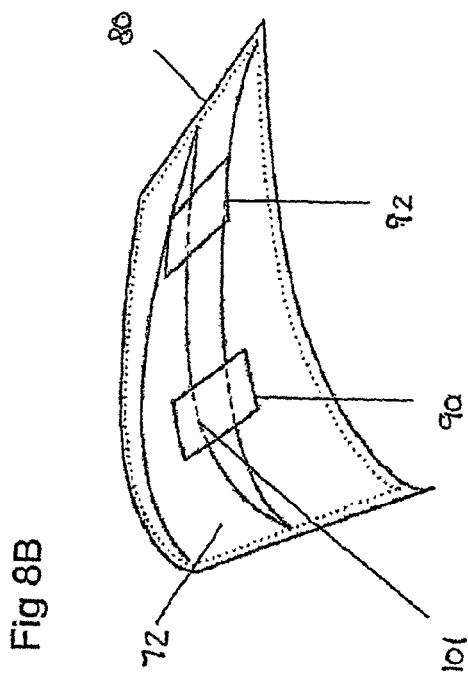
Figure 8B:
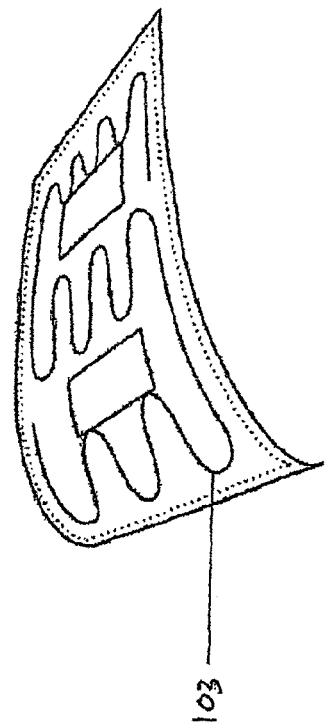
Figure 8C:
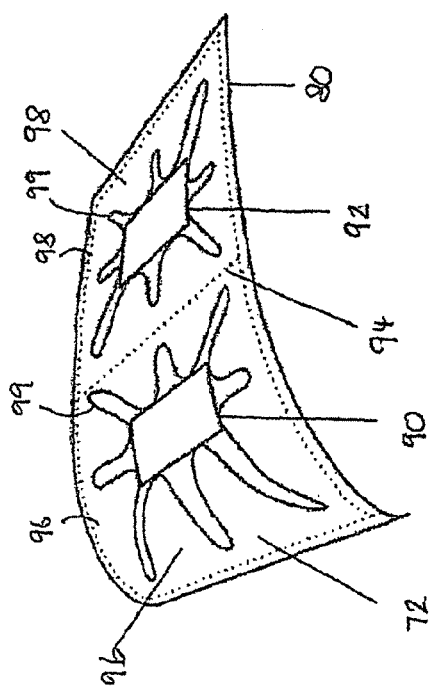
Figure 8D:
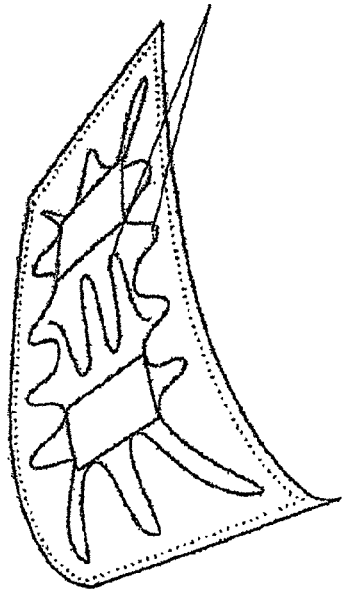

If there are more than two loops, the surface may be partitioned into areas such that each loop has an associated area to which it belongs 68. A suitable surface measurement path is generated for each area 70. FIGS. 8A-8D illustrate a typical NURBS surface 72 (e.g. a face of a turbine blade) with three loop boundaries 80,90,92. In FIG. 8A, a partition line has been created 94 to create two areas 96,98 equivalent to that illustrated in FIG. 7. Areas 96,98 contain loops 90,92 respectively. Curvilinear surface measurement paths 99 are shown in each area 96,98. Other measurement paths may be created using alternative strategies, for example FIG. 8B illustrates a 'sharks tooth' curvilinear measurement path 101 over the whole surface and FIGS. 8C and 8D illustrate different arrangements of curvilinear measurement paths 103.

FIGS. 6,7 and 8 illustrate curvilinear measurement paths based on sine waves. However, other measurement paths may be used. Furthermore a set of discrete measurement paths can be generated for each surface or area.

Once the measurement path has been created, a set of surface points can be generated along the path at a selected frequency.

An alternative method of creating measurement paths on each surface is described below with reference to FIGS. 9-14. This method is particularly suitable for use with polygonal models but can be used for general geometric models in other formats, including B-Rep. As polygonal models are not parameterised, surfaces of the model must be identified using techniques which will not be described here further.

FIG. 9 is a flow diagram for the method of creating a measurement profile on a planar surface. Once the planar surface has been selected 123, a face aligned bounding box is created 124. A measurement path, in this example a curvilinear path based on a sine wave is generated across the bounding box face which is parallel to the plane of the planar surface 126. Each point of the measurement path is projected on to the plane of the planar surface 128 using the normal of the bounding box's face. Points which do not contact the surface of the planar face are removed from the measurement path. The software determines whether points have been removed 130.

If points have been removed, then for each segment of the measurement path, it is determined whether a collision free path can generated 134 to join segments. The profile segments are either joined directly 136 by a path along the surface if possible or joined by an off surface path 138.

A resulting surface measurement path is thereby created 132.

FIGS. 10 and 11 illustrate a measurement path being created on a planar surface of a cylinder in this way. In FIG. 10 a curvilinear profile 140 is shown plotted on a plane parallel but offset to the planar surface 142 of the cylinder 144. In FIG. 11 the curvilinear path 146 is plotted onto the planar surface 142. The measurement path has been modified by paths 148 along the surface and off surface paths 150 which join segments of the measurement path.

FIG. 12 is a flow diagram for the method of creating a measurement path on a periodic face, such as a cylindrical face. The periodic face is first selected 150 and a periodic measurement path, such as a helix is generated 152 which, for an external cylinder is larger than the cylindrical face and for an internal cylinder is smaller than the cylindrical face. As before, each point of the helix is projected onto the cylinder. Points which do not contact the surface are removed from the helix 154. The software determines whether points have been removed 156.

As before, where points are removed, a path is generated to join segments of the measurement path. It is determined whether a collision free linear path can be generated between the segments of the measurement profile 160. If it can, a linear path is generated to join the segments together 162. Otherwise, the segments can be joined by an off surface path 164. A resulting surface measurement path is thereby created 158.

FIGS. 13A and 13B illustrate a measurement path being created on an internal cylindrical face of a cylinder. FIG. 13A illustrates a helical path 166 plotted inside the internal bore 168 of the cylinder 144. FIG. 13B illustrates the helix 170 projected onto the bore surface with path modification 172 and off surface paths 174 to join segments of the measurement path across surface discontinuities.

FIG. 14 is a flow diagram for path planning on general surfaces. As can be seen, most of the steps on FIG. 14 are the same as for FIGS. 9 and 12, showing path planning on planar and cylindrical faces. However, in step 176 the user selects an unknown fact and in step 178 the user chooses the measurement path, rather than a default one being chosen for the surface type. For example line, curvilinear, and helical path may be chosen, in addition to manually created profiles. Steps 180-190 are similar to steps 154-164 in FIG. 12.

As in the method described with reference to FIGS. 4-8 the measurement path can be used to generate a series of surface points.

Figure 3:
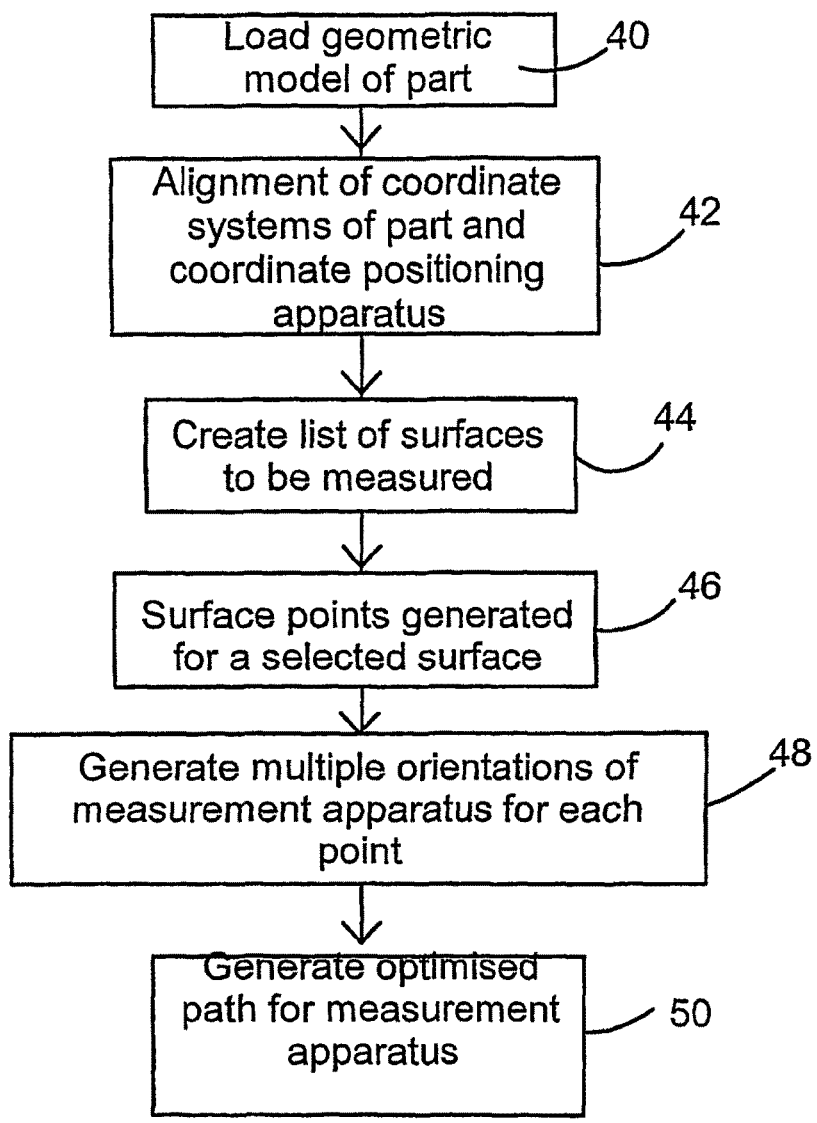
FIG. 3 is a flow diagram illustrating an overview of the method of the present invention.

Once the measurement path has been generated (step 46 in FIG. 3), multiple orientations of the probe 28 along the measurement path can be generated (step 48 in FIG. 3). A method of generating the multiple orientations of the measurement apparatus for each point is described below with reference to FIG. 15.

In a first step, a series of surface points are generated 102, for example as described in the methods described with reference to FIGS. 4-8 and FIGS. 9-14.

Each surface point is checked to ensure that the surface detection region of the probe 28 may be positioned in a position sensing relationship with it without the probe 28 colliding with other faces of the workpiece 104. For a contact probe, the surface detection region is the probe tip and it is in a position sensing relationship with the point when it is in contact with the point. For a non contact probe, the surface detection region may comprise a point or plane offset from the measurement apparatus which is preferably positioned at the surface for optimal measurement, for example a focal point for an optical probe.

In a next step, the required motion of the surface detection region is generated between surface points 106. This motion of the surface detection region is checked to ensure the surface detection region remains on the surface of the workpiece during the move 108 and that there is no collision with other surfaces of the workpiece 110.

In a next step, the coordinate positioning apparatus positions are calculated to position the surface detection region of the probe 28 at a position sensing relationship with the surface points 112. Multiple coordinate positioning apparatus positions are generated for each surface point, each with the surface detection region at the surface point but with the probe 28 positioned at different orientations. In the case where the coordinate positioning apparatus comprises an articulating probe head mounted on a positioning apparatus, different probe head angles (A1 and A2 angles) are calculated to provide different probe 28 orientations. The term probe head angle relates to the angle the probe head holds the measurement apparatus about the A1 and A2 axes.

The generation of different probe 28 orientations may be influenced by parameters of the part, such as a principle axis of a surface and its periodicity. For example, an internal cylindrical surface, such as a bore, has a principle axis along its centre and is periodic. This principle axis determines the preferred locus of orientations of the probe 28.

This is equivalent to a mathematical function based approach to course of motion generation. For example, for a periodic surface such as a bore a course of motion may be generated by oscillating the articulating probe head around the A1 axis while moving the articulating probe head along the principal axis of the bore.

Where such a functional approach is used, the possible orientations of the probe 28 may be limited, for example to within a defined plane or cone.

If parameters of the workpiece, such as principle axis and periodicity are not available, then a random set of orientations of the probe 28 can be generated.

Irrespective of their generation method, the orientations of the probe must be 'legal'. An orientation can be considered legal when it is collision free. Other factors for determining whether an orientation is legal can also include whether the probe is within mechanical constraints such as the typical working volume of the coordinate positioning apparatus and its consequent available configuration space. Factors for determining whether an orientation is legal can further include whether the orientation violates any configuration constraints such as the angle between the probe and surface normal.

Each orientation of the measurement apparatus is checked to see if it places the probe or coordinate positioning apparatus in collision with the workpiece or any other part in the measurement volume. Collision free orientations are kept and used to generate an optimised course of motion, whilst other orientations are rejected.

Where the movement of the probe head has been initially constrained by generating head angles along a preferred head locus any found collisions have the effect of 'loosening' the path as further probe configurations are generated that deviate away from those preferred head angles. A function based approach will be similarly affected by collision checking.

Collision free orientations of the probe 28 are generated until a required number is obtained, or until a maximum number of generation iterations is reached. The former has the advantage of achieving comprehensive orientation generation within a practical time frame. The latter constraint has the benefit of preventing the system from entering an orientation generation loop caused by an unreachable, i.e. the probe cannot physically access the point, and consequently un-measurable surface point.

The calculation of the orientations of the probe at a measurement point is schematically illustrated with reference to FIG. 17 in which there is shown a CAD model 33 of an artefact to be measured by the probe. A measurement path 35 along which the artefact is to be measured has been calculated, for example using the above described methods. The probe for measuring the artefact is abstractly represented in the CAD model 37 as a first sphere 39 representing the probe tip, a cylinder 41 representing the stylus and a second sphere 43 representing the probe head. The software generates a plurality of different orientations of a CAD model 37 of the probe 28 relative to the CAD model 33 of the artefact for a plurality of points along the measurement path.

For example, for a first measurement point A, the CAD model 37 of the probe is shown at first 37a, second 37b and third 37c calculated orientations relative to the CAD model 35 of the artefact. As shown, the probe tip 39 is at the same point on the surface of the CAD model 33 of the artefact for each of the three orientations. Accordingly, the different orientations are achieved by effectively repositioning the model of the head 43 of the probe relative to the model 33 of the artefact. For the three shown orientations, only the first 37a orientation is legal as at least a part of the CAD model 37 of the probe at the other two orientations 37b and 37c are in a collision state with the CAD model 33 of the artefact. The parts in collision are illustrated by dotted lines 45. Accordingly, in this case the software can choose the first orientation 37a only out of the three determined orientations.

Again, for a second measurement point B, the CAD model 37 of the probe is shown at first 37d, second 37e and third 37f calculated orientations relative to the CAD model 35 of the artefact. As shown, the probe tip 39 is at the same point on the surface of the CAD model 33 of the artefact for each of the three orientations. Accordingly, the different orientations are achieved by repositioning the model of the head 43 of the probe relative to the model 33 of the artefact. For the three shown orientations, the first 37d and second 37e orientations are legal but the third orientation 37f is not—a part of the CAD model 37 of the probe at the third orientation 37f is in a collision state with the CAD model 33 of the artefact (illustrated by dotted line 45). Accordingly, in this case the software can choose between the first 37d and second 37e orientations for use in the final course of motion. How the software chooses between these orientations is described in more detail below and can for example depend on performance factors.

Only a few orientations for a couple of measurement points are shown in connection with FIG. 17 for the sake of simplicity and clarity of illustration. However, as will be understood, it is possible to calculate fewer or more orientations of the CAD model 37 of the probe relative to the CAD model 33 of the artefact for each measurement point along a path. Furthermore, it is possible to determine orientations for many more measurement points along the measurement path 35.

Once a sufficient number of orientations of the probe 28 have been generated, an optimised course of motion for the probe 28 is generated (see step 50, FIG. 3). This course of motion joins one of the multiple probe 28 orientations for each surface point. The course of motion of the probe 28 can be optimised for different criteria, for example for the shortest or fastest path of the probe 28.

In particular, the coordinate positioning apparatus may have different inertial deflection characteristics for different axes and the path may be optimised to limit the accelerations of the different parts of the system based on the known inertial deflection characteristics of each axis, such that the best speed can be achieved for a given required accuracy. For the case where the coordinate positioning apparatus comprises an articulating probe head mounted on a CMM, the articulating probe head may be stiffer than the CMM and thus bend less than the CMM under acceleration. The course of motion can therefore be optimised by minimising acceleration of the CMM to thereby reduce bending.

Different methods may be used to optimise the course of motion, for example A* search, Floyd-Warshall algorithms, Johnson's and Bellman-Ford algorithms and Genetic algorithms. All are well known and are not described further.

In a preferred embodiment, Dijkstra's algorithm is used and this is described in more detail below. This is a well known computationally expensive algorithm that can determine the shortest path by taking a source node and computing an edge weight between it and all other nodes. The weight of each edge is a value that describes the desirability of using it, with the lowest value indicating the most desirable node pair connection. Once the most desirable node pair connection is found the first node is removed from the set and process repeated with the second node and so on.

The application of Dijkstra's algorithm to course of motion optimisation in the present invention is described below with reference to FIG. 16.

FIG. 16 illustrates four surface points 200, 202, 204, 206 on a surface measurement path. For each surface point 202-206, a number of different legal probe orientations have been generated, with each orientation as a node. FIG. 16 illustrates a set of nodes representing the set of probe orientations for each surface point. For example surface point 202 has three probe orientations 202A, 202B, 202C. For different surface points the number of possible probe orientation differs. All possible measurement apparatus orientations (nodes) are connected by edges (represented by lines 208 joining the nodes) and the weights 210 on each edge 208 have been computed as the cost of moving between node pairs. The 'cost' is dependent upon applied metrics.

The applied metrics employed to assign desirability weights are chosen in accordance with factors governing the optimisation of the path. Examples of possible metrics include the computation of the time required to perform the move of the probe between start and finish points and the distance moved by the coordinate positioning apparatus to position the measurement apparatus. In this way the course of motion may be optimised for different factors, such as the shortest or fastest course of motion.

Other cost metrics may also be used, such as methods that weight course of motions to minimise acceleration of parts of the coordinate positioning apparatus (such as the CMM when the coordinate positioning apparatus comprises an articulating probe head mounted on a CMM).

The values in the boxes 212 beneath each node are the minimum cost of moving to that node from the previous node. Therefore, the course of motion that is selected can, for instance, be the one with the minimum cost on any node of the last point. This is shown as the bold path 114.

FIG. 18 provides a schematic CAD model illustration of the determined course of motion of the probe along a part of the measurement path of the artefact to be measured, at a plurality of discrete measurement points. In particular, the chosen orientation of the probe at each of a plurality of measurement points along the measurement path 35 of the CAD model 33 of the artefact is shown by the CAD models 37 of the probe. As will be understood, the orientation of the probe at fewer or greater measurement points than shown can be calculated as part of the course of motion.

As will be understood, it is not essential that the method of the invention generates visual CAD models illustrating the various possible orientations (e.g. as shown in FIG. 17) or the final determined course of motion (e.g. as shown in FIG. 18). Rather, FIGS. 17 and 18 have been provided to merely aid the description of how the method of the invention might be executed in one particular embodiment. Nevertheless, as will be understood, it could be an optional feature of the invention that a visual representation of the relationship between the CAD model of the artefact and CAD model of the probe is provided. This could for instance aid a user in assessing the determined course of motion.

In the described embodiments the probe is mounted on a mounting structure equivalent to the quill of a CMM. This invention is also suitable for use with planning the course of motion of a measurement device mounted on other machine types. For example, the probe may be mounted onto the distal end of an inspection robot, which may for example comprise a robotic arm having several articulating joints.

In the described embodiments, it is assumed that the probe is moved. However, as will be understood, the invention can also be applicable to embodiments in which the workpiece is moved instead of or as well as the probe. For instance, the workpiece could be mounted on the moveable quill of a positioning apparatus. Optionally the workpiece could be mounted on a table that can be rotated, and/or reoriented relative to the probe.

Furthermore, the described embodiment relates to a measurement device and an operation for measuring an artefact. As will be understood, the invention can also be used to generate course of motion data for other types of devices, and for example for tools for machining an artefact. For instance, the invention could be used to determine the course of motion of a milling tool during a milling operation. For example, path data which represents a path across a surface of an artefact along which a cutting tool is to cut a feature (e.g. a channel) can be received as well as and geometric data representing the cutting tool, and the method could be used to determine how to orient the cutting tool whilst it is moved along the cutting path.

The invention claimed is:

1. A computer-implemented method for determining a course of motion between an artefact and a measurement device for interacting with the artefact, the artefact and the measurement device being moveable relative to each other in at least one linear and one rotational degree of freedom, the method comprising:
   receiving, by a processing unit and before the measurement device and the artefact relatively move in a position sensing relationship so as to obtain measurement data about the artefact, first geometric data representing the artefact;
   receiving, by the processing unit, second geometric data representing the measurement device; and
   automatically determining, by the processing unit, the course of motion between the artefact and the measurement device based upon the received first and second geometric data, the determining of the course of motion including:
   determining, from the received first and second geometric data, instructions for automatically manipulating a relative angular orientation between the measurement device and the artefact about the at least one rotational degree of freedom as the measurement device and the artefact relatively move in the position sensing relationship so as to obtain the measurement data about the artefact along a measurement path, wherein the instructions for automatically manipulating the relative angular orientation comply with one or more optimisation criteria.

2. The method as claimed in claim 1, wherein the one or more optimisation criteria comprises collision free movement.

3. The method as claimed in claim 1, further comprising determining how the relative angular orientation between the measurement device and artefact can be controlled in order to meet one or more performance criteria.

4. The method as claimed in claim 3, wherein the one or more performance criteria comprises at least one of i) device acceleration, ii) speed of interaction, iii) path length and iv) direction of motion of the device.

5. The method as claimed in claim 3, wherein the one or more performance criteria comprises a preferred relative angular orientation between the measurement device and artefact.

6. The method as claimed in claim 1, further comprising determining for each of a plurality of points along the measurement path a plurality of relative angular orientations between the device and artefact.

7. The method as claimed in claim 6, further comprising selecting only collision free angular orientations.

8. The method as claimed in claim 6, further comprising determining the cost of movement between a pair of points with a first angular orientation combination and the cost of movement between the same pair of points with a second angular orientation combination.

9. The method as claimed in claim 8, further comprising repeating the step of claim 8 for a plurality of pairs of points along the measurement path.

10. The method as claimed in claim 9, further comprising selecting those angular orientations in which the total cost along the measurement path complies with predetermined criteria.

11. The method as claimed in claim 1, wherein the device is a contact probe.

12. The method as claimed in claim 1, wherein the device is a non-contact probe.

13. The method as claimed in claim 1, wherein the device is moveable in at least three orthogonal linear degrees of freedom and at least two orthogonal rotational degrees of freedom.

14. The method as claimed in claim 1, further comprising receiving geometric data relating to objects located in the device's movement volume.

15. The method as claimed in claim 1, further comprising generating the measurement path using the first and second geometric data.

16. The method as claimed in claim 1, further comprising controlling a positioning machine to move a measurement device mounted thereon in accordance with the course of motion data so as to interact with an artefact.

17. The method as claimed in claim 16, wherein the positioning machine is a coordinate measuring machine.

18. The method as claimed in claim 16, wherein the positioning machine is a machine tool.

19. A non-transitory computer readable storage medium storing instructions which, when executed by a computer, causes the computer to perform the method of claim 1.

20. A computer comprising:
   a processor; and
   a memory, wherein
   at least one of the processor and memory is adapted to perform the method of claim 1.

* * * * *